US012647949B2

(12) United States Patent
Horiuchi et al.

(10) Patent No.: US 12,647,949 B2
(45) Date of Patent: Jun. 2, 2026

(54) TERMINAL AND TRANSMISSION METHOD

(71) Applicant: Panasonic Intellectual Property Corporation of America, Torrance, CA (US)

(72) Inventors: Ayako Horiuchi, Kanagawa (JP); Hidetoshi Suzuki, Kanagawa (JP); Akihiko Nishio, Osaka (JP)

(73) Assignee: Panasonic Intellectual Property Corporation of America, Torrance, CA (US)

(*) Notice: Subject to any disclaimer, the term of this patent is extended or adjusted under 35 U.S.C. 154(b) by 878 days.

(21) Appl. No.: 17/628,529

(22) PCT Filed: May 1, 2020

(86) PCT No.: PCT/JP2020/018463
§ 371 (c)(1),
(2) Date: Jan. 19, 2022

(87) PCT Pub. No.: WO2021/014713
PCT Pub. Date: Jan. 28, 2021

(65) Prior Publication Data
US 2022/0256535 A1 Aug. 11, 2022

(30) Foreign Application Priority Data
Jul. 25, 2019 (JP) ................................. 2019-137127

(51) Int. Cl.
*H04W 72/0446* (2023.01)
(52) U.S. Cl.
CPC ............................... *H04W 72/0446* (2013.01)

(58) Field of Classification Search
CPC ... H04W 72/0446; H04W 4/40; H04W 92/18; H04L 5/0044; H04L 5/0083; H04L 5/0023; H04L 5/0033
See application file for complete search history.

(56) References Cited

U.S. PATENT DOCUMENTS

2015/0163771 A1 6/2015 Kim et al.
2018/0249448 A1 8/2018 Yasukawa et al.
2019/0029043 A1 1/2019 Harada et al.
(Continued)

FOREIGN PATENT DOCUMENTS

CN 103703706 A 4/2014
JP 2017-139665 A 8/2017
(Continued)

OTHER PUBLICATIONS

3GPP, "3rd Generation Partnership Project; Technical Specification Group Radio Access Network; NR; Study on NR Vehicle-to-Everything (V2X) (Release 16)," 3GPP TR 38.885 V16.0.0, Mar. 2019. (122 pages).
(Continued)

*Primary Examiner* — Chuong M Nguyen
(74) *Attorney, Agent, or Firm* — Seed Intellectual Property Law Group LLP

(57) ABSTRACT
This terminal is provided with: a circuit that, on the basis of information relating to the number of symbols usable in some time interval, determines disposition of one or more channels in the time interval; and a transmitter that transmits the channel in accordance with the disposition.

12 Claims, 12 Drawing Sheets

(56)            References Cited

U.S. PATENT DOCUMENTS

| | | | |
|---|---|---|---|
| 2019/0082452 A1 | 3/2019 | Zheng et al. | |
| 2019/0380125 A1 | 12/2019 | Yamamoto et al. | |
| 2020/0029318 A1* | 1/2020 | Guo | H04W 72/23 |
| 2020/0260386 A1* | 8/2020 | Ryu | H04W 76/14 |
| 2020/0305127 A1* | 9/2020 | Huang | H04W 72/02 |
| 2020/0351033 A1* | 11/2020 | Ryu | H04L 1/1854 |
| 2020/0413348 A1* | 12/2020 | Ryu | H04W 52/241 |
| 2021/0028910 A1* | 1/2021 | Cheng | H04L 5/0064 |
| 2021/0314933 A1* | 10/2021 | Zhang | H04W 72/20 |
| 2022/0132516 A1* | 4/2022 | Hwang | H04W 24/10 |
| 2022/0353825 A1* | 11/2022 | Ryu | H04W 52/383 |

FOREIGN PATENT DOCUMENTS

| | | | |
|---|---|---|---|
| JP | 2019-520734 A | 7/2019 | |
| WO | 2017/038509 A1 | 3/2017 | |
| WO | 2018/173483 A1 | 9/2018 | |

OTHER PUBLICATIONS

International Search Report, mailed Jun. 30, 2020, for International Application No. PCT/JP2020/018463, 5 pages (with English translation).

* cited by examiner

TERMINAL AND TRANSMISSION METHOD

TECHNICAL FIELD

The present disclosure relates to a terminal and a transmission method.

BACKGROUND ART

A communication system called the 5th Generation Mobile Communication System (5G) has been studied. It has been considered for 5G to flexibly provide functions for use cases that require an increase in high-speed communication traffic, an increase in the number of terminals to be connected, high reliability, and/or low latency. The 3rd Generation Partnership Project (3GPP), which is an international standard development organization, has been studying development of communication systems in terms of both enhancement of the Long Term Evolution (LTE) system and New Radio (NR).

3GPP has studied support for vehicle to everything (V2X) in the LTE system, and has been studying the support for V2X also in NR, in which a band broader than in the LTE system is available (see, for example, Non Patent Literature 1).

CITATION LIST

Non Patent Literature

NPL 1
3GPP TR 38.885 V16.0.0, "Study on NR Vehicle-to-Everything (V2X) (Release 16), 2019-03

SUMMARY OF INVENTION

There is scope for further study, however, on a signal transmission method for improving transmission efficiency in radio communication.

One non-limiting and exemplary embodiment facilitates providing a terminal and a transmission method each capable of improving transmission efficiency in radio communication.

A terminal according to an embodiment of the present disclosure includes: circuitry, which, in operation, determines mapping of one or a plurality of channels in a certain time period based on information on a number of symbols available in the time period; and a transmitter, which in operation, transmits the one or plurality of channels in accordance with the mapping.

It should be noted that general or specific embodiments may be implemented as a system, an apparatus, a method, an integrated circuit, a computer program, a storage medium, or any selective combination thereof.

According to an exemplary embodiment of the present disclosure, it is possible to improve transmission efficiency in radio communication.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 2 illustrates an exemplary symbol configuration for sidelink;

DESCRIPTION OF EMBODIMENTS

Figures 1A, 1B, 1C:
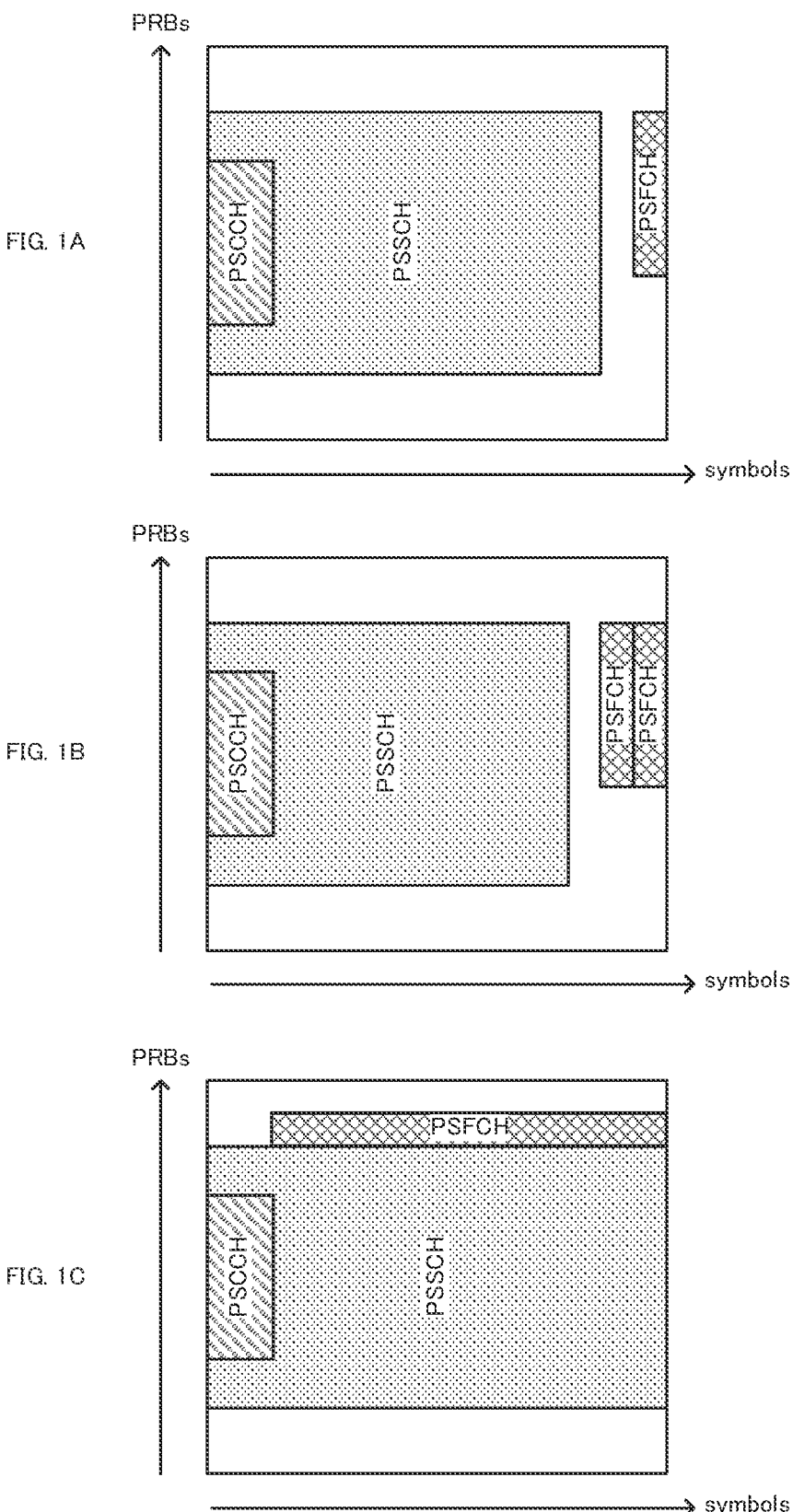
FIG. 1A illustrates an exemplary format of a physical sidelink feedback channel (PSFCH)
FIG. 1B illustrates another exemplary format of the PSFCH.
FIG. 1C illustrates still another exemplary format of the PSFCH.

Hereinafter, embodiments of the present disclosure will be described in detail with reference to the accompanying drawings.

Vehicle to Vehicle (V2V), Vehicle to Infrastructure (V2I), Vehicle to Pedestrian (V2P), or Vehicle to Network (V2N) communication is assumed as V2X, for example.

In the V2V, V2I, or V2P, for example, terminals (or also referred to as user equipment (UE)) can perform direct transmission and reception with each other using a link called "sidelink (SL)" or "PC5" without a network with a base station (BS: also referred to as gNB in NR and eNB in LTE). Further, communication through a link between a base station and a terminal (e.g., referred to as "Uu"), for example, is assumed in the V2N.

A resource used in the sidelink is configured depending on a SL bandwidth part (BWP) and a resource pool.

The SL BWP is, for example, a frequency band available to a terminal for the sidelink. The SL BWP is configured separately from a Downlink (DL) BWP and an Uplink (UL) BWP, for example, which are configured for a link (e.g., Uu link) between a base station and a terminal. Note that the frequency bands possibly overlap with each other between the SL BWP and the UL BWP.

The resource pool includes, for example, a resource in the frequency and time directions specified in a resource of the SL BWP. For example, a plurality of resource pools may be configured to a single terminal.

[Sidelink in NR]

For NR V2X, studies have been conducted on supporting, for example, unicast, groupcast, and broadcast in sidelink transmission and reception.

In unicast, one-to-one transmission from a transmitter terminal (e.g., also called transmitter UE or Tx UE) to a receiver terminal (e.g., receiver UE or Rx UE) is assumed, for example. In groupcast, transmission from a transmitter terminal to a plurality of receiver terminals included in a certain group is assumed, for example. In broadcast, transmission from a transmitter terminal without specifying a receiver terminal is assumed, for example.

Further, studies have been carried out on configuring, for example, the following channels for NR sidelink.

<Physical SL Control Channel: PSCCH>

In a PSCCH, a control signal called sidelink control information (SCI) is transmitted and received, for example. The SCI includes, for example, information on transmission and reception of a data signal (e.g., physical SL shared channel (PSSCH)) such as resource allocation information for the PSSCH.

In addition, the SCI may include, for example, information on a transmitter terminal (e.g., Layer 1 source ID) and information on a receiver terminal (e.g., Layer 1 destination ID). Such information specifies the transmitter terminal and the receiver terminal.

<PSSCH>

In a PSSCH, a data signal is transmitted and received, for example.

<PSFCH>

In a PSFCH, a feedback signal (e.g., hybrid automatic repeat request (HARQ) feedback) for a PSSCH (e.g., data signal) are transmitted and received, for example. The feedback signal may include, for example, a response signal indicating ACK or NACK (e.g., also referred to as ACK/NACK information or HARQ-ACK). The feedback signal is considered to be applied, for example, to a case where the PSSCH is transmitted and received in unicast and groupcast. The ACK and NACK may be respectively referred to as HARQ-ACK and HARQ-NACK, for example.

<Physical SL Broadcast Channel: PSBCH>

In a PSBCH, a broadcast signal is transmitted and received.

[PSFCH]

Next, the PSFCH will be described.

In unicast in sidelink, for example, a receiver terminal generates ACK when determining that received data has been successfully decoded, and generates NACK when determining that the data has failed to be decoded. The receiver terminal then transmits a feedback signal including ACK/NACK information indicating the generated ACK or NACK by the PSFCH, for example.

For groupcast in sidelink, two methods have been studied in terms of the feedback signal transmission in the PSFCH, for example.

The first method is, for example, a method of transmitting the feedback signal by the PSFCH as is the case with the unicast. The second method is, for example, a method of transmitting NACK by the PSFCH when the receiver terminal determines that received data has failed to be decoded, and not transmitting ACK when the data has been successfully decoded.

In groupcast, for example, the feedback signals are transmitted from a plurality of receiver terminals to a transmitter terminal. For example, the receiver terminals transmit no ACKs in the second method, and this allows multiplex transmission of the feedback signals (i.e., NACKs) in the same PSFCH among a plurality of terminals. Meanwhile, when each of the terminals transmits either ACK or NACK as in the first method, for example, a resource area of the PSFCH (hereinafter, referred to as a PSFCH area) is divided for each terminal.

Next, exemplary formats of the PSFCH will be described.

FIGS. 1A, 1B, and 1C illustrate exemplary formats of the PSFCH. For example, FIG. 1A illustrates a format in which information is indicated in sequence as in NR PUCCH format 0 and the PSFCH is mapped to a single symbol. FIG. 1B illustrates a format in which a PSFCH format of a single symbol is repeated (i.e., performs repetition) and the PSFCHs are mapped to a plurality of symbols. FIG. 1C illustrates a format in which the PSFCH is mapped over a plurality of symbols as in NR PUCCH format 2.

The PSFCH is possibly mapped to, for example, a symbol not overlapping with the PSCCH and PSSCH (see, for example, FIGS. 1A and 1B) at a back part (e.g., the end part) of the symbols available for sidelink (hereinafter, referred to as sidelink symbols or SL symbols) in a slot (in other words, a certain time period), and is also possibly frequency-multiplexed (in other words, subject to Frequency Division Multiplexing (FDM)) with the PSSCH (see, for example, FIG. 1C).

As previously described, the PSFCH is a channel for transmitting a feedback signal for a PSSCH. For example, the receiver terminal receives a PSSCH signal, decodes the PSSCH signal, and transmits a feedback signal in the PSFCH including a result of determination, by a cyclic redundancy check (CRC), whether the PSSCH has been successfully decoded.

A transmission timing of the PSFCH (i.e., after how many slots or symbols the feedback signal for the PSSCH is transmitted in the PSFCH) may be configured considering, for example, processing time of the receiver terminal such as decoding of the PSSCH or generation of the PSFCH signal. A method is conceivable of configuring the transmission timing of the PSFCH in advance to be, for example, a slot or symbol positioned after a certain number of slots or symbols from the slot or symbol where the PSSCH is received. Another method is also conceivable of specifying the PSFCH resource when the PSSCH transmission is indicated by the PSCCH.

Note that each of the PSFCHs illustrated in FIG. 1 is not limited to corresponding to the feedback for the PSSCH in the same slot as the PSFCH, and may correspond to, for example, the feedback for the PSSCH in an earlier slot. For example, the PSFCH illustrated in FIG. 1C cannot FDM-transmit the feedback for the PSSCH in the same slot. Thus, the PSFCH illustrated in FIG. 1C is a channel for transmitting the feedback signal for an earlier PSSCH (not illustrated).

[Communication Mode of Sidelink]

Sidelink communication includes, for example, two modes (e.g., Mode 1 and Mode 2).

In Mode 1, a base station determines (i.e., schedules) a resource that a terminal uses for sidelink (referred to as an SL resource, for example).

In Mode 2, a terminal determines the SL resource from resources in a resource pool configured in advance. In other words, a base station does not schedule the SL resource in Mode 2.

Mode 1 is intended to be used, for example, in an environment where the base station and the terminal are connected and the terminal performing sidelink communication can receive an indication from the base station. In Mode 2, for example, the terminal can perform transmission without an indication from the base station, so that the sidelink communication is possible with a terminal under a different operator or a terminal outside coverage.

Sidelink has been described, thus far.

There is scope for further study on channel mapping (also referred to as assignment) in NR V2X sidelink.

For example, in a case where DL communication through a link (e.g., Uu link) between a base station and a terminal and sidelink communication are performed in the same component carrier (CC) or adjacent carriers, the terminal that receives a DL signal transmitted from the base station may be affected by interference from the sidelink communication, and the DL received quality may be degraded accordingly.

In order to reduce the interference of the sidelink communication on the DL signal, Uu UL symbols, for example, are possibly used for the SL resource instead of using Uu DL symbols.

For example, it is assumed in Mode 2 that a terminal cannot receive an indication from a base station and Uu UL symbols are used for the SL resource instead of using DL symbols.

Also in Mode 1, Uu UL symbols may be configured to be used for the SL resource instead of using DL symbols. Alternatively, since a terminal is indicated by a base station which resource to use in Mode 1, it is assumed that Flexible symbols are used for the SL resource in addition to the Uu UL symbols. Note that the Flexible symbols are symbols possibly used for both DL and UL. In the Uu link, the Flexible symbols are configured to a terminal by, for example, higher layer signaling. Further, the symbols configured as the Flexible symbols can also be assigned to either DL symbols or UL symbols, for example, by group common downlink control information (DCI) (or referred to as DCI format 2_0) or an indication of individual DCI.

Figure 2:
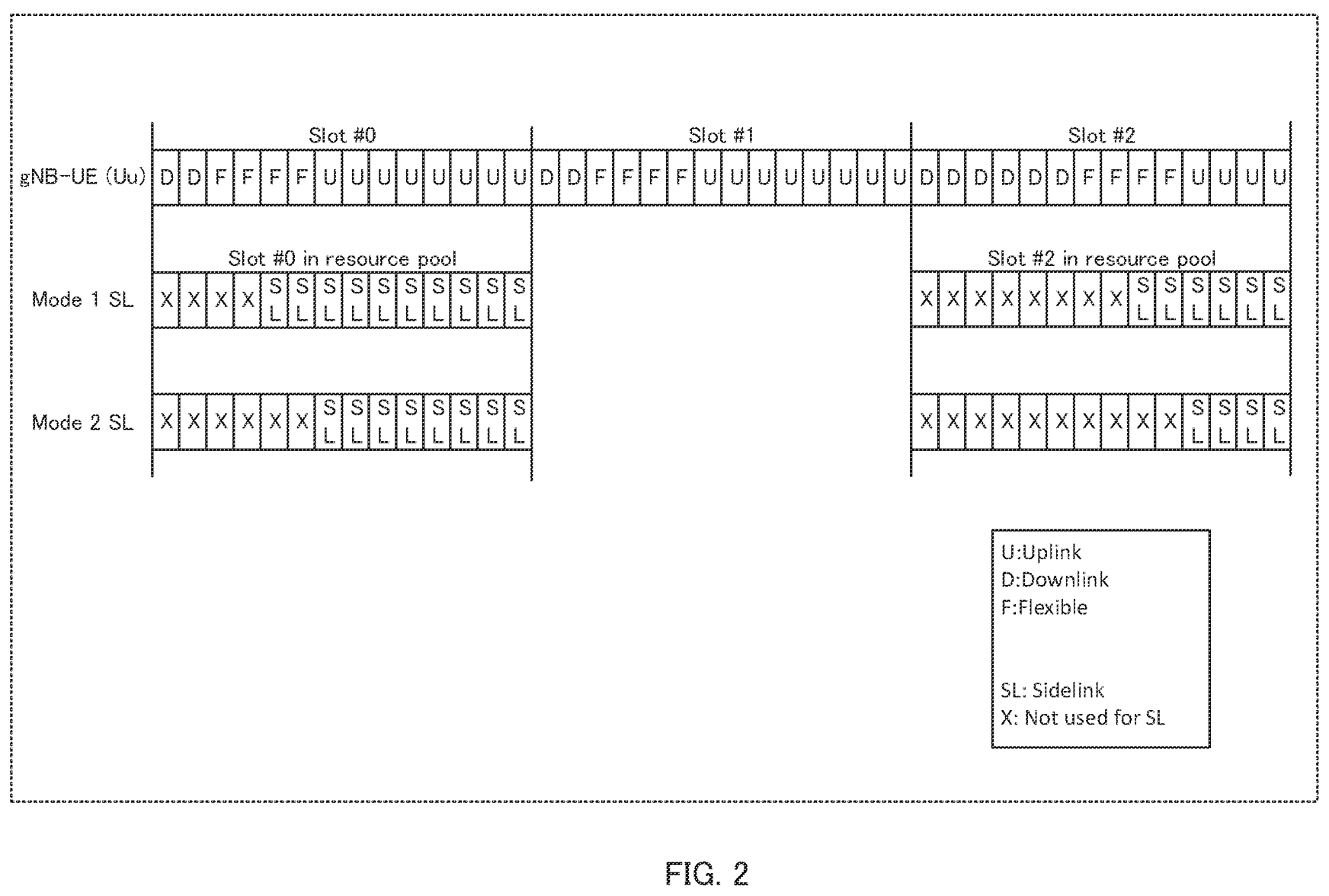

FIG. 2 illustrates an exemplary symbol configuration for sidelink.

In the example illustrated in FIG. 2, slot #0 and slot #2 are slots included in a resource pool used for sidelink, and slot #1 is a slot excluded from the resource pool used for sidelink.

In the example illustrated in FIG. 2, UL symbols (e.g., denoted as "U") or Flexible symbols (e.g., denoted as "F") on the Uu link (link between gNB and UE), for example, are available for sidelink in Mode 1. SL symbols in the slots are possibly configured separately from a Uu symbol configuration, for example. The symbols denoted as "X" in FIG. 2 are symbols not used for sidelink, and the symbols denoted as "SL" are the SL symbols used for sidelink. As illustrated in FIG. 2, all the Flexible symbols or UL symbols in the Uu need not be configured as the SL symbols.

Further, in the example illustrated in FIG. 2, for example, the UL symbols (U) on the Uu link are available for sidelink in Mode 2. As in Mode 1, the SL symbols in the slots are possibly configured separately from the Uu symbol configuration in Mode 2, for example.

In both Mode 1 and Mode 2, a configuration method on sidelink such as slot numbers included in the resource pool and the symbol configuration in the slots (e.g., symbols denoted by "X" and "SL") are configured to a terminal, for example.

The configuration method on sidelink may be, for example, pre-configured in a specification (e.g., standard), may be configured in an application layer called "Pre-configured", may be pre-configured in a subscriber identity module (SIM) mounted on the terminal, or may be configured by higher layer signaling (e.g., higher layer parameter) such as a system information block (SIB) called "config-ured" or other radio resource control (RRC).

In terms of the SL resource, the configuration per slot and the configuration per symbol may be configured simultaneously or individually. For example, in the case where the sidelink configuration per slot and the sidelink configuration per symbol are configured individually, update frequencies of the configurations may be different from each other.

As in the example illustrated in FIG. 2, on the Uu link, the configuration of the DL symbols, Flexible symbols, and UL symbols (e.g., pattern of the numbers and positions of those symbols) is possibly different for each slot. Accordingly, the configuration of the SL symbols (e.g., the number and positions of SL symbols) is also possibly different for each slot in the resource pool.

Here, the smaller the number of SL symbols in a slot, the smaller the amount of resources where side link signals are assigned, so that a transport block size (TBS) is small. The smaller the TBS, the lower the coding gain and the greater the ratio of control signal overhead to a data signal. In addition, in a case where the same TBS is configured for initial transmission and retransmission in the sidelink communication, for example, the smaller the TBS for the initial transmission, the smaller the TBS for the retransmission, thereby decreasing retransmission efficiency. As described above, the number of SL symbols in a slot is sometimes not suitable for transmission and reception of a data signal in the PSSCH, and the transmission efficiency of the sidelink communication is possibly decreased.

Note that, although the above description is based on the PSSCH, the same applies to another sidelink channel (e.g., PSCCH, PSFCH or PSBCH) and the number of SL symbols in a slot is possibly sometimes not suitable for transmission and reception of a signal in the channel.

In this regard, an embodiment of the present disclosure will provide descriptions of methods of improving the transmission efficiency in the sidelink communication.

For example, in an embodiment of the present disclosure, a set value (e.g., minimum value) of the number of SL symbols per slot is changed according to the channel for transmitting and receiving a signal on sidelink. With such a configuration of the number of SL symbols, for example, different numbers of symbols can be reserved depending on the channels to be mapped in the slot, thereby improving the transmission efficiency of the sidelink communication.

Embodiment 1

[Overview of Communication System]

A communication system according to the present embodiment includes base station 100 and terminal 200.

Figure 3:
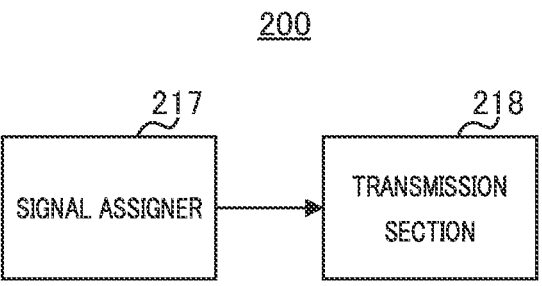
FIG. 3 is a block diagram illustrating an exemplary configuration of a part of a terminal.

FIG. 3 is a block diagram illustrating an exemplary configuration of a part of terminal 200 according to the present embodiment. In terminal 200 illustrated in FIG. 3, signal assigner 217 (e.g., corresponding to circuitry) determines mapping of one or more channels in a certain time period (e.g., slot) based on information on the number of symbols available in the time period. Transmission section 218 (e.g., corresponding to a transmitter) includes a transmitter that transmits the channels according to the mapping.

[Configuration of Base Station]

Figure 4:
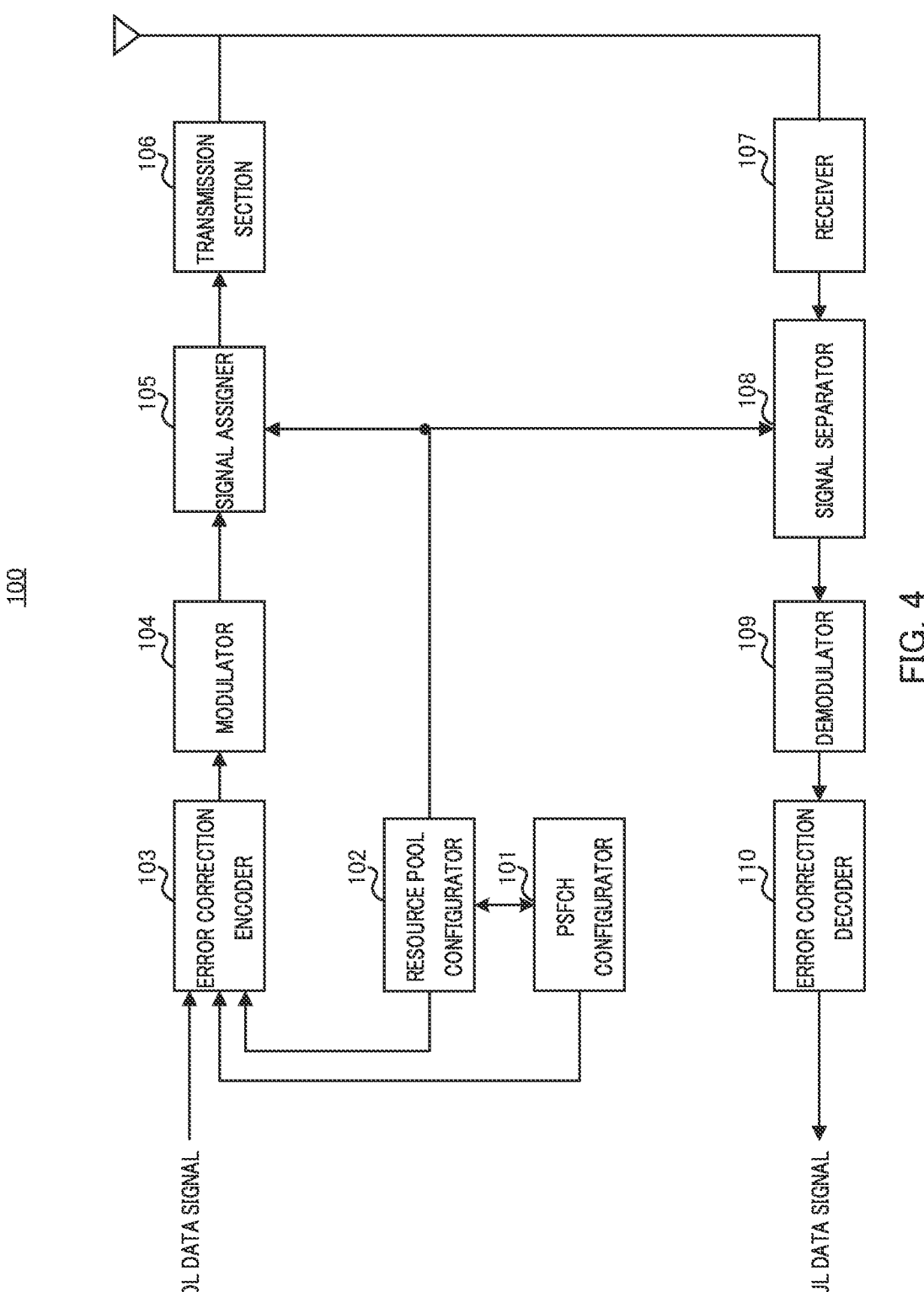
FIG. 4 is a block diagram illustrating an exemplary configuration of a base station.

FIG. 4 is a block diagram illustrating an exemplary configuration of base station 100 according to the present embodiment. In FIG. 4, base station 100 includes PSFCH configurator 101, resource pool configurator 102, error correction encoder 103, modulator 104, signal assigner 105, transmission section 106, receiver 107, signal separator 108, demodulator 109, and error correction decoder 110.

PSFCH configurator 101 configures a slot where a PSFCH is mapped for each resource pool to be allocated to terminal 200, for example, based on resource pool configuration information inputted from resource pool configurator 102. PSFCH configurator 101 may configure, for example, a period of the slot where the PSFCH is mapped (in other words, transmission period of PSFCH, hereinafter referred to as "N"). Alternatively, PSFCH configurator 101 may configure, for example, a shift amount (hereinafter, referred to as "L") of the slot where the PSFCH is mapped. For example, PSFCH configurator 101 generates information on the PSFCH defined by at least one of period N and shift amount L (hereinafter, referred to as PSFCH configuration information), and outputs the information to resource pool configurator 102. PSFCH configurator 101 also outputs higher layer signaling including the PSFCH configuration information to error correction encoder 103.

Resource pool configurator 102 configures a resource pool to be used for sidelink for each terminal 200. For example, resource pool configurator 102 generates information on a time resource and a frequency resource of the resource pool (hereinafter, referred to as resource pool configuration information). For example, resource pool configurator 102 may configure UL symbols of a link (e.g., Uu link) between a base station and a terminal to be a time resource (e.g., symbols) available for the resource pool. In addition, resource pool configurator 102 may configure, in Mode 1, UL symbols and Flexible symbols of the Uu link to be the symbols available for the resource pool.

Further, resource pool configurator 102 determines whether the number of symbols in the slot where each channel (e.g., PSCCH, PSSCH, and PSFCH) is mapped satisfies a predetermined number of symbols (hereinafter, also referred to as a set value), for example, based on the PSFCH configuration information inputted from PSFCH configurator 101. For example, resource pool configurator 102 determines whether the number of symbols in the slot where the PSCCH, PSSCH and PSFCH are mapped is equal to or greater than the set value for the number of symbols (e.g., values such as Y1 to Y8 to be described later) based on the PSFCH configuration information inputted from PSFCH configurator 101.

The set value (i.e., threshold) for the number of symbols may be configured in accordance with at least one of a type of the channel, such as the PSCCH, PSSCH, PSFCH, or PSBCH, and a combination of the channels (e.g., PSCCH and PSSCH) configured in the slot.

When the number of symbols in the slot where the channels are mapped is equal to or greater than the set value, resource pool configurator 102 outputs higher layer signaling including the resource pool configuration information to error correction encoder 103. Resource pool configurator 102 also outputs the resource pool configuration information to PSFCH configurator 101, signal assigner 105, and signal separator 108. Resource pool configurator 102 need not output the resource pool configuration information when the number of symbols in the slot where the channels are mapped is less than the set value.

Error correction encoder 103 takes a transmission data signal (DL data signal) and higher layer signaling inputted from PSFCH configurator 101 as input, performs error correction coding on the input signal, and outputs the coded signal to modulator 104.

Modulator 104 performs modulation processing on the signal inputted from error correction encoder 103, and outputs the modulated data signal to signal assigner 105.

Signal assigner 105, for example, identifies a slot available on the link (e.g., Uu link) between base station 100 and terminal 200 and a slot available for sidelink communication based on the information inputted from resource pool configurator 102. Signal assigner 105 then assigns the data signal (e.g., DL data signal or higher layer signaling) inputted from modulator 104 to the resource available on the Uu link. The formed transmission signal is outputted to transmission section 106.

Note that the configuration of the resource pool may be different for each terminal 200. In this case, the available slot on the Uu link is different for each terminal 200.

Transmission section 106 performs radio transmission processing, such as up-conversion, on the signal inputted from signal assigner 105, and transmits the signal to terminal 200 via an antenna.

Receiver 107 receives a signal transmitted from terminal 200 via the antenna, performs radio reception processing such as down-conversion, and outputs the signal to signal separator 108.

Signal separator 108, for example, identifies the slot available on the Uu link and the slot available for the sidelink communication based on the information inputted from resource pool configurator 102. Signal separator 108 then separates the signal assigned to the resource available on the Uu link, which is received from receiver 107. Signal separator 108 outputs the separated signal (e.g., UL data signal) to demodulator 109.

Demodulator 109 performs demodulation processing on the signal inputted from signal separator 108, and outputs the resulting signal to error correction decoder 110.

Error correction decoder 110 decodes the signal inputted from demodulator 109, and obtains the received data signal (UL data signal) from terminal 200.

Note that, in the example illustrated in FIG. 4, base station 100 includes PSFCH configurator 101 and resource pool configurator 102 and generates higher layer signaling including PSFCH configuration information and resource pool configuration information, but the present disclosure is not limited to this. For example, at least one of the PSFCH configuration information and the resource pool configuration information may be configured in an application layer called Pre-configured, for example, or may be configured in an SIM in advance. In this case, base station 100 may use the pre-configured information without generating the PSFCH configuration information or the resource pool configuration information. For example, base station 100 may recognize the slot available between base station 100 and terminal 200 based on the pre-configured resource pool configuration information, and may output information indicating the slot available between base station 100 and terminal 200 to signal assigner 105 and signal separator 108.

[Configuration of Terminal]

Figure 5:
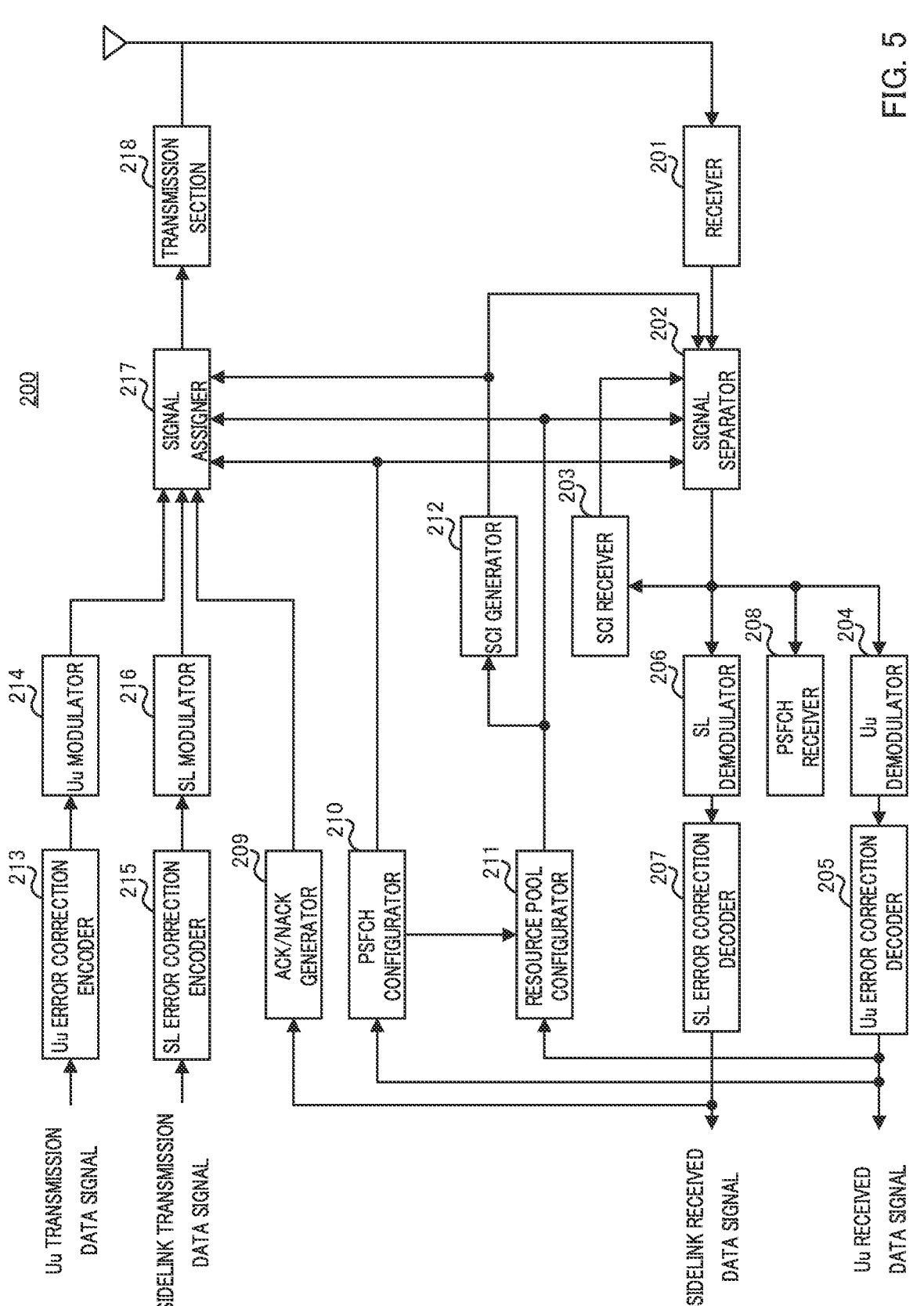
FIG. 5 is a block diagram illustrating an exemplary configuration of the terminal.

FIG. 5 is a block diagram illustrating an exemplary configuration of terminal 200 according to the present embodiment. In FIG. 5, terminal 200 includes receiver 201, signal separator 202, SCI receiver 203, Uu demodulator 204, Uu error correction decoder 205, SL demodulator 206, SL error correction decoder 207, PSFCH receiver 208, ACK/NACK generator 209, PSFCH configurator 210, resource pool configurator 211, SCI generator 212, Uu error correction encoder 213, Uu modulator 214, SL error correction encoder 215, SL modulator 216, signal assigner 217, and transmission section 218.

Receiver 201 receives a received signal via an antenna, and outputs the signal to signal separator 202 after performing reception processing, such as down-conversion, on the signal.

Signal separator 202 separates a signal component corresponding to the link (e.g., Uu link) between base station 100 and terminal 200 from the signal inputted from receiver 201 based on the resource pool configuration information inputted from resource pool configurator 211, and outputs the separated signal component to Uu demodulator 204.

In addition, signal separator 202 separates signal components of sidelink from the signal inputted from receiver 201 based on the resource pool configuration information. Signal separator 202 then outputs, for example, a PSCCH signal among the signal components of sidelink to SCI receiver 203. Signal separator 202 also separates a PSSCH signal addressed to terminal 200 from the signal components of sidelink inputted from receiver 201 based on resource allocation information inputted from SCI receiver 203, and outputs the separated signal to SL demodulator 206.

Further, signal separator 202 specifies a resource where the PSFCH is mapped (e.g., a resource where a feedback signal transmitted from another terminal is assigned) based on the PSFCH configuration information inputted from PSFCH configurator 210 and the resource pool configuration information inputted from resource pool configurator 211. For example, signal separator 202 may specify the resource of the feedback signal (e.g., ACK/NACK information from another terminal based on information about a slot where the PSFCH is mapped and information about a PSSCH signal that terminal 200 has previously transmitted to another terminal according to the resource allocation information inputted from SCI generator 212. Then, signal separator 202 outputs information on the specified resource and a signal in the specified resource to PSFCH receiver 208.

SCI receiver 203 demodulates and decodes the PSCCH signal component inputted from signal separator 202. For example, when SCI receiver 203 attempts to demodulate and decode the PSCCH signal and successfully decodes the signal (in other words, when SCI included in the PSCCH is detected), SCI receiver 203 outputs, to signal separator 202, the resource allocation information of the PSSCH addressed to terminal 200 included in the SCI. Note that SCI receiver 203 may determine whether the information included in the SCI is information addressed to terminal 200, for example, based on destination information included in the SCI.

Uu demodulator 204 performs demodulation processing on the signal inputted from signal separator 202, and outputs the resulting demodulated signal to Uu error correction decoder 205.

Uu error correction decoder 205 decodes the demodulated signal inputted from Uu demodulator 204, outputs the obtained higher layer signaling to PSFCH configurator 210 and resource pool configurator 211, and outputs the obtained received data signal (or referred to as a Uu received data signal).

SL demodulator 206 performs demodulation processing on the signal inputted from signal separator 202, and outputs the resulting demodulated signal to SL error correction decoder 207.

SL error correction decoder 207 decodes the demodulated signal inputted from SL demodulator 206, and performs error determination such as a cyclic redundancy check (CRC) on the decoded signal. SL error correction decoder 207 outputs the determination result to ACK/NACK generator 209. When the decoded signal has no error, SL error correction decoder 207 outputs the obtained received data signal (or referred to as a sidelink received data signal).

PSFCH receiver 208 receives a feedback signal (e.g., ACK/NACK information for a PSSCH transmitted by terminal 200) transmitted from another terminal based on the information inputted from signal separator 202.

ACK/NACK generator 209 generates ACK/NACK information (e.g., information including either ACK or NACK)

based on the determination result of the CRC inputted from SL error correction decoder 207, and outputs the generated information to signal assigner 217. In a case of the feedback signal for unicast or groupcast, for example, ACK/NACK generator 209 may generate the ACK/NACK information including either ACK or NACK based on the determination result of the CRC. In a case of the feedback signal for groupcast, for example, ACK/NACK generator 209 may output the ACK/NACK information to signal assigner 217 when it is NACK, and need not output the ACK/NACK information when it is ACK.

PSFCH configurator 210, for example, configures a slot where the PSFCH is mapped based on the PSFCH configuration information included in the higher layer signaling inputted from Uu error correction decoder 205. The slot where the PSFCH is mapped may be defined by, for example, at least one of period N and shift amount L of the slot where the PSFCH is mapped. PSFCH configurator 210 outputs the configured information to resource pool configurator 211, signal separator 202, and signal assigner 217.

Resource pool configurator 211, for example, configures a resource pool (e.g., time resource and frequency resource) used by terminal 200 for sidelink based on the resource pool configuration information included in the higher layer signaling inputted from Uu error correction decoder 205.

In a case where the link (e.g., Uu link) between base station 100 and terminal 200 and the sidelink overlap with each other or are configured in interfering component carriers or BWPs, for example, resource pool configurator 211 may determine whether the symbols available for the resource pool are the UL symbols on the Uu link or, in Mode 1, whether the symbols available for the resource pool are either the UL symbols or the Flexible symbols.

Further, resource pool configurator 211 determines whether the number of symbols in the slot in the resource pool satisfies a condition based on, for example, the set value for the number of symbols configured for each channel (e.g., PSCCH, PSSCH and PSFCH) according to the slot where the PSFCH is mapped, which is inputted from PSFCH configurator 210, and the resource pool configuration information. For example, resource pool configurator 211 may determine whether the number of symbols in the slot where at least one of the PSCCH, PSSCH, and PSFCH is mapped is equal to or greater than the set value for the number of symbols (e.g., any one of Y1, Y2, and Y3 to be described later). When the number of symbols in the slot is equal to or greater than the set value, resource pool configurator 211 outputs the resource configuration information to SCI generator 212, signal separator 202, and signal assigner 217. When the number of symbols in the slot is less than the set value, in contrast, resource pool configurator 211 does not output the resource configuration information.

SCI generator 212 configures a resource to transmit the PSSCH, for example, based on the information inputted from resource pool configurator 211 (e.g., information indicating the slot and the resource available for sidelink). SCI generator 212 generates SCI including information on the configured resource. The SCI may include, for example, information that identifies source terminal 200 (e.g., source ID) and information that identifies destination terminal 200 (e.g., destination ID). SCI generator 212 outputs the generated SCI to signal separator 202 and signal assigner 217.

Uu error correction encoder 213 takes a Uu-link transmission data signal (UL data signal) as input, performs error correction coding on the transmission data signal, and outputs the coded signal to Uu modulator 214.

Uu modulator 214 modulates the signal inputted from Uu error correction encoder 213, and outputs the modulated signal to signal assigner 217.

SL error correction encoder 215 takes a sidelink transmission data signal (sidelink data signal) as input, performs error correction coding on the transmission data signal, and outputs the coded signal to SL modulator 216.

SL modulator 216 modulates the signal inputted from SL error correction encoder 215, and outputs the modulated signal to signal assigner 217.

Signal assigner 217 assigns, to a sidelink resource, a PSCCH signal including the SCI and a PSSCH signal including the sidelink data signal inputted from SL modulator 216, for example, based on the information inputted from resource pool configurator 211 and the information inputted from SCI generator 212. In addition, signal assigner 217 assigns the ACK/NACK information inputted from ACK/NACK generator 209 to the sidelink resource, for example, based on the information of the slot where the PSFCH is mapped, which is inputted from PSFCH configurator 210. Signal assigner 217 also assigns the signal inputted from Uu modulator 214 to a Uu-link resource (for example, uplink data channel (Physical Uplink Shared Channel: PUSCH)), for example. Signal assigner 217 outputs the signals assigned to the resources to transmission section 218.

Transmission section 218 performs radio transmission processing, such as up-conversion, on the signals inputted from signal assigner 217 and transmits the signals.

Note that, in the example illustrated in FIG. 5, terminal 200 receives higher layer signaling including PSFCH configuration information and resource pool configuration information, but the present disclosure is not limited to this. For example, at least one of the PSFCH configuration information and the resource pool configuration information may be configured in the application layer called Pre-configured, for example, or may be configured in the SIM in advance. In this case, terminal 200 may use the pre-configured information without receiving the PSFCH configuration information or the resource pool configuration information. For example, terminal 200 may recognize the slot available between base station 100 and terminal 200 and the slot available for sidelink based on the pre-configured resource pool configuration information, and may use the information on the slots in signal separator 202 and signal assigner 217.

[Operations of Base Station 100 and Terminal 200]

Next, exemplary operations of base station 100 (see FIG. 4) and terminal 200 (see FIG. 5) will be described.

Figure 6:
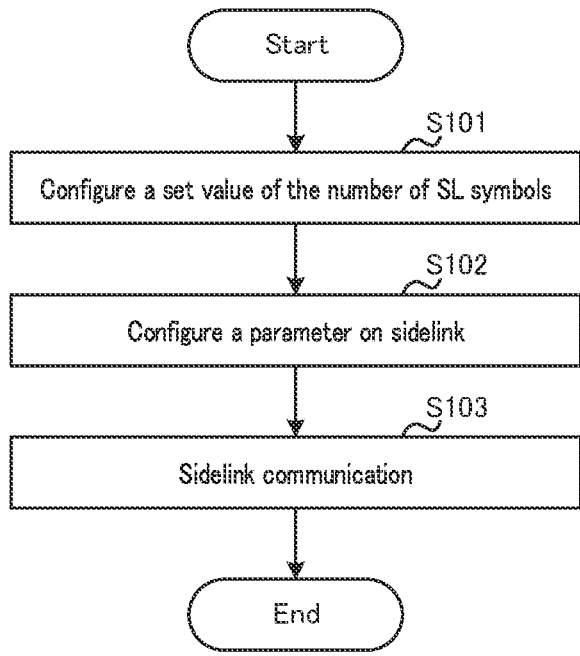
FIG. 6 is a flowchart illustrating an exemplary operation of the terminal.

FIG. 6 is a flowchart illustrating exemplary processing in terminal 200.

Terminal 200 that performs transmission and reception on sidelink configures a set value (e.g., minimum number) for the number of SL symbols per slot, for example (S101). For example, the set value for the number of SL symbols per slot is different for each channel (e.g., PSCCH, PSSCH, PSFCH or PSBCH).

Terminal 200 configures a parameter on the sidelink (S102). The parameter on the sidelink may include, for example, configurations of SL BWP, a resource pool, and a channel (e.g., including PSFCH) mapped in each slot.

Note that, in the present embodiment, the number of SL symbols configured to terminal 200 based on the parameter on the sidelink is equal to or greater than the set value for the number of SL symbols. In other words, the number of SL symbols satisfies the set value. Terminal 200 recognizes that channel transmission and reception with SL symbols less in number than the set value is not indicated. For example, when the number of SL symbols less than the set value is indicated, terminal 200 may consider that the indication is an error.

Terminal 200 performs sidelink communication based on the configured parameter (S103), Note that the set value for the number of SL symbols per slot and the parameter on the sidelink (e.g., PSFCH configuration information and resource pool configuration information) for terminal 200 may be configured in the standard in advance, may be configured in the application layer called Pre-configured, may be configured in the SIM in advance, or may be configured in a higher layer such as SIB called configured or other RRC, for example.

Next, the set value (e.g., minimum value) for the number of SL symbols per slot will be described.

For example, set values Y1, Y2, Y3, and Y4 configured for each channel or for each combination of the channels may be configured as follows. In addition, following set values Y1, Y2, Y3, and Y4 may be configured by combining two or more of the set values.

<Y1 Symbol(s)>

When the number of SL symbols per slot is equal to or greater than Y1 symbols, terminal 200 may map the PSCCH, PSSCH and PSFCH in the slot.

<Y2 Symbol(s)>

When the number of SL symbols per slot is equal to or greater than Y2 symbols, terminal 200 can map the PSCCH and PSSCH in the slot. Further, for the combination of Y1 and Y2, when Y1>Y2 and Y1>SL symbols≥Y2, terminal 200 can map the PSCCH and PSSCH in the slot unless the PSFCH is mapped.

<Y3 Symbol(s)>

When the number of SL symbols per slot is equal to or greater than Y3 symbols, terminal 200 may map the PSFCH in the slot. Further, for the combination of Y1 and Y3, when Y1>Y3 and Y1>the number of SL symbols≥Y3, terminal 200 can map the PSFCH in the slot unless the PSCCH and PSSCH are mapped.

<Y4 Symbol(s)>

When the number of SL symbols per slot is equal to or greater than Y4 symbols, terminal 200 can map the PSBCH in the slot.

Operation Example 1 according to the present embodiment will be described below.

Operation Example 1

In Operation Example 1, Y1 and Y2 are configured to terminal 200.

In addition, a transmission timing of the PSFCH is configured to be period N, for example. In other words, the PSFCH is mapped every N slots.

Further, a channel (e.g., at least one of PSCCH, PSSCH and PSFCH) transmitted and received in each of slots available for sidelink (i.e., slots in a resource pool) is configured to terminal 200.

Additionally, the number of SL symbols in a slot available for the sidelink is configured to terminal 200, for example, based on the configuration of the channel to be transmitted and received in the slot. For example, the number of SL symbols in the slot where the PSCCH, PSSCH, and PSFCH are mapped is configured to be the number of symbols equal to or greater than Y1. For example, the number of SL symbols in the slot where the PSCCH and PSSCH are mapped is configured to be the number of symbols equal to or greater than Y2.

In Operation Example 1, the PSCCH and PSSCH are also mapped in the slot where the PSFCH is mapped. Further, Y1 or more symbols are configured as the number of SL symbols in any of the slots where the PSFCHs are mapped. Meanwhile, the PSCCH and PSSCH are possibly mapped in the slot where no PSFCH is mapped, for example. Further, Y2 or more symbols are configured as the number of SL symbols in any of the slots where the PSCCHs and PSSCHs are mapped and no PSFCH is mapped.

Note that a transmission timing of the PSFCH for the PSSCH received by terminal 200 (e.g., after how many slots from the slot where the PSSCH is received the PSFCH can be transmitted) may be determined in advance, for example.

Figure 7:
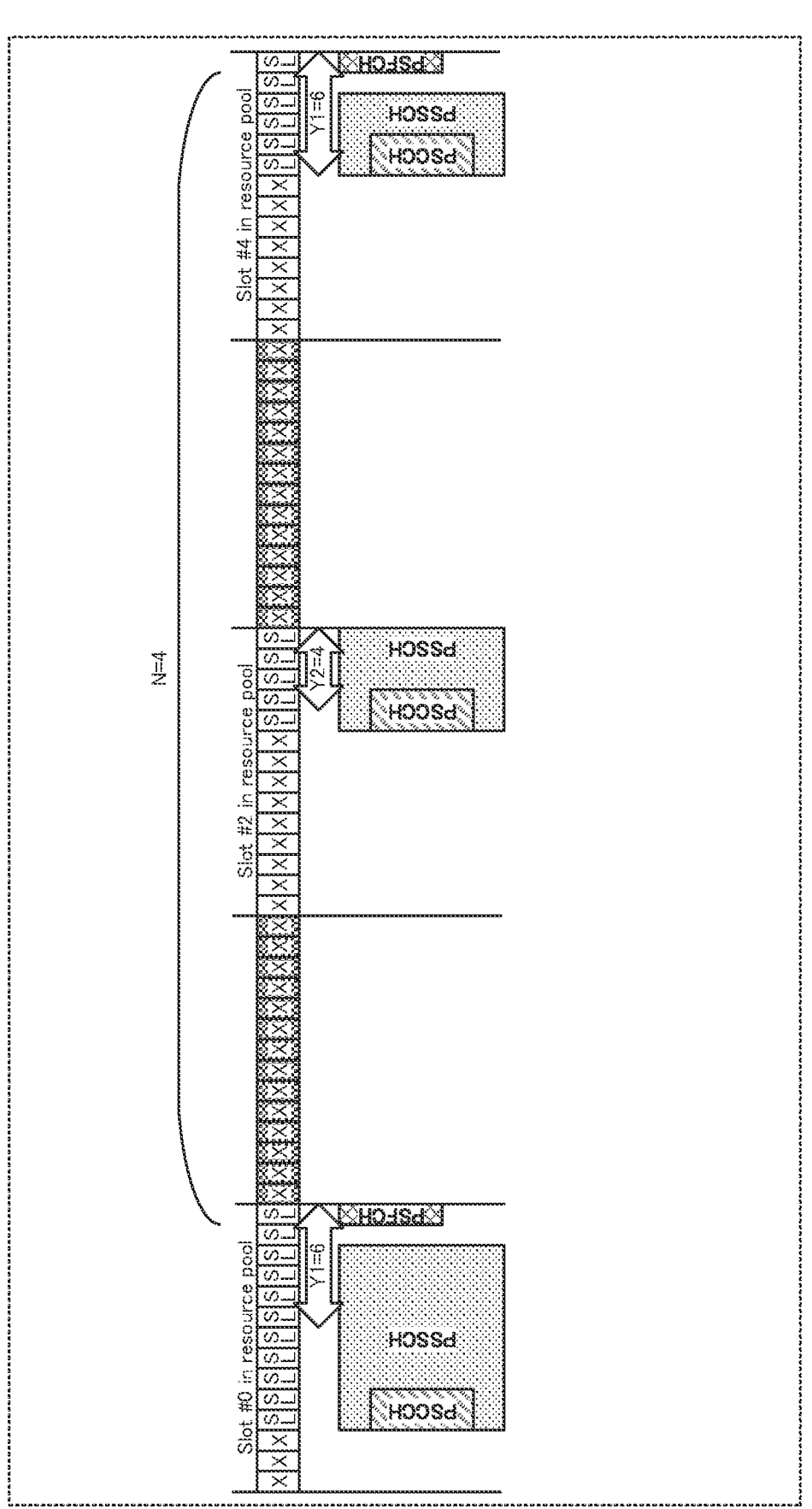
FIG. 7 illustrates exemplary mapping of sidelink channels according to Operation Example 1.

FIG. 7 illustrates exemplary mapping of the sidelink channels according to Operation Example 1.

In FIG. 7, the number of PSFCH symbols is set to 1, and the PSFCH is mapped at the back (e.g., end) part of SL symbols in a slot. In addition, Y1=6, Y2=4, and N=4 in FIG. 7.

As illustrated in FIG. 7, the PSCCH, PSSCH and PSFCH are mapped in slot #0 and slot #4, which correspond to a transmission period of the PSFCH. The number of SL symbols per slot is 11 symbols in slot #0 and 6 symbols in slot #4. The number of SL symbols is 6 or more symbols in slot #0 and slot #4, thus satisfying the condition of Y1 (=6) or more.

Also, as illustrated in FIG. 7, the PSCCH and PSSCH are mapped in slot #2, which does not correspond to the transmission period of the PSFCH. The number of SL symbols per slot in slot #2 is 5 symbols. Thus, slot #2 does not satisfy the condition where the number of SL symbols is Y1 (=6) or more. Slot #2 is, however, not a slot where the PSFCH is mapped and satisfies the condition of Y2 (=4) or more. In other words, terminal 200 can map the PSCCH and PSSCH in slot #2 even without satisfying the condition that the number of SL symbols is Y1 or more.

In Operation Example 1, as illustrated in FIG. 7, a resource pool configured to terminal 200 includes slots #0 and #4 where the PSCCH, PSSCH and PSFCH are mapped, and slot #2 where the PSCCH and PSSCH are mapped (i.e., no PSFCH is mapped). In Operation Example 1, channels corresponding to the numbers of SL symbols are mapped in the respective slots for terminal 200. For example, each slot is configured with symbols equal to or greater in number than a set value (e.g., Y1 or Y2) corresponding to the channels to be configured.

Further, in Operation Example 1, the number of channels mapped in a slot with Y1 or more SL symbols (3 channels in Operation Example 1) is more than the number of channels mapped in a slot with less than Y1 SL symbols (2 channels in Operation Example 1), for example. In other words, in Operation Example 1, the PSCCH and PSSCH are possibly mapped while no PSFCH is mapped in a slot with a smaller number of SL symbols (e.g., slot including less than Y1 SL symbols) among slots in the resource pool. Meanwhile, in Operation Example 1, the PSCCH, PSSCH, and PSFCH are possibly mapped in a slot with a larger number of SL symbols (e.g., slot including Y1 or more SL symbols) among the slots in the resource pool, for example.

With such channel mapping in the slots, the slot with a smaller number of SL symbols can reserve symbols available for the PSSCH by mapping no PSFCH, thereby improving the transmission efficiency (e.g., retransmission efficiency) of the PSSCH, for example.

In Operation Example 1, for example, a PSFCH configuration (e.g., transmission period N of the PSFCH) and an SL symbol configuration (e.g., the number of SL symbols) per slot are configured to terminal 200. Further, in Operation Example 1, it is not assumed that the number of SL symbols does not satisfy Y1 (e.g., the number of SL symbols is less than Y1) in the slot (e.g., slots #0 and #4) where mapping of the PSCCH, PSSCH and PSFCH is configured. Likewise, it is not assumed that the number of SL symbols does not satisfy Y2 (e.g., the number of SL symbols is less than Y2) in the slot (e.g., slot #2) where mapping of the PSCCH and PSSCH is configured and mapping of the PSFCH is not configured.

Thus, terminal 200 determines the mapping of one or more channels in a slot based on the information configured to terminal 200 (e.g., information on the number of available SL symbols configured in the slot or information on the channels to be mapped in the slot), and transmits the channels according to the determined mapping of the channels.

Further, terminal 200 may determine whether the SL symbol configuration to be configured for each channel is an assumed configuration based on the channel mapping in each slot and the set value for the number of SL symbols corresponding to the channels mapped in each slot.

For example, terminal 200 may perform sidelink transmission and reception based on the information configured to terminal 200 when determining that the SL symbol configuration is the assumed configuration.

When determining that the SL symbol configuration is not the assumed configuration, in contrast, terminal 200 may determine that the configuration information on the sidelink (e.g., PSFCH configuration information or resource pool configuration information) has been received in error, for example. In the example illustrated in FIG. 7, for example, terminal 200 may determine that the configuration information on the sidelink has been received in error when the number of SL symbols is less than Y1 in the slot where the PSCCH, PSSCH and PSFCH are mapped or when the number of SL symbols is less than Y2 in the slot where the PSCCH and PSSCH are mapped. Terminal 200 may acquire the configuration information again, for example, when determining that the configuration information on the sidelink has been received in error.

As described above, in Operation Example 1, for example, a parameter satisfying a configuration condition (e.g., relation between the number of SL symbols and set value Y1 or Y2) in the slot where the PSFCH is mapped is configured to terminal 200. Such a parameter configuration allows terminal 200 to simply operate according to the parameter configured to terminal 200, thereby simplifying the operation in terminal 200.

Note that, although PSFCH transmission period N=4 in FIG. 7 as an example and the PSFCHs are mapped in the slots with slot number 4K (K is an integer), the value of N is not limited to 4 and may be another value. For example, the value of N may be a multiple of 5. In the Uu link, for example, a period of a Synchronization Signal Block (SSB) is set to a multiple of 5 (e.g., 5, 10, 20, 40, 80, and 160). For example, in a case where terminal 200 divides monitoring of the SSB in the Uu link and the sidelink transmission/reception in units of slots, setting PSFCH period N to a multiple of 5 makes it easier to support processing (e.g., transmission and reception) of both the links.

Further, the configuration of the PSFCH transmission timing is not only based on transmission period N, and may be configured based on shift amount L. In a case where shift amount L is configured, for example, the PSFCHs are mapped in the slots with slot number 4K+L (K is an integer).

For example, shift amount L is an integer smaller than N, and may be given by L=(0, 1, . . . , N–1).

Embodiment 2

A base station and a terminal according to the present embodiment have the same basic configuration as those of base station 100 and terminal 200 according to Embodiment 1.

In the present embodiment, terminal 200 determines mapping of one or more channels in a slot based on the number of SL symbols available in the slot, and transmits the channels according to the determined mapping of the channels.

For example, when a slot where a plurality of channels, such as the PSCCH, PSSCH, and PSFCH, are configured has a large number of SL symbols (e.g., the number of SL symbols in the slot is Y1 or more), terminal 200 maps the PSCCH, PSSCH, and PSFCH in the slot. Meanwhile, when a slot where a plurality of channels are configured has a small number of SL symbols (e.g., the number of SL symbols in the slot is less than Y1), terminal 200 maps the PSCCH and PSSCH without mapping the PSFCH, for example.

In other words, even in a slot corresponding to PSFCH transmission period N, terminal 200 maps the PSCCH and PSSCH without mapping the PSFCH when the condition (e.g., Y1 or more) of the number of SL symbols for transmitting the PSFCH (i.e., three channels of PSCCH, PSSCH, and PSFCH) is not satisfied. In this case, terminal 200 may assign a signal of the PSCCH or PSSCH to a resource configured for the PSFCH, for example.

Such channel mapping in slots allows, in a slot with insufficient symbols for PSFCH transmission while corresponding to PSFCH transmission period N, terminal 200 to transmit and receive another sidelink channel (e.g., PSCCH or PSSCH). For example, even when PSFCH transmission period N and a period of the slots available for the sidelink are difficult to match, terminal 200 can still perform sidelink transmission and reception. Thus, the present embodiment makes it possible to improve the transmission efficiency of sidelink communication.

Operation examples (e.g., Operation Examples 2 and 3) according to the present embodiment will be described below.

Operation Example 2

In Operation Example 2, Y1 and Y2 are configured to terminal 200,

In addition, a transmission timing of the PSFCH is configured to be period N, for example. In other words, the PSFCH is mapped every N slots.

Operation Example 2 includes a condition where the number of SL symbols is Y1 or more symbols in a slot where the PSCCH, PSSCH, and PSFCH are mapped, as in Operation Example 1. Operation Example 2 also includes a condition where the number of SL symbols is Y2 or more symbols in a slot where the PSCCH and PSSCH are mapped while no PSFCH is mapped.

Unlike Operation Example 1, however, a condition where the number of SL symbols is Y1 or more symbols in a slot corresponding to PSFCH transmission period N need not be satisfied in Operation Example 2. In other words, less than Y1 SL symbols are possibly configured in a slot corresponding to PSFCH transmission period N in Operation Example 2.

When the condition where the number of SL symbols is Y1 or more symbols is not satisfied in a slot where the PSFCH is supposed to be mapped but, for example, the condition where the number of SL symbols is Y2 or more symbols is satisfied, terminal 200 may map the PSCCH and PSSCH without mapping the PSFCH. Note that, when the condition where the number of SL symbols is Y2 or more symbols is not satisfied, terminal 200 need not map the PSFCH, PSCCH, and PSSCH, for example, and may alternatively map a channel corresponding to another condition (for example, condition corresponding to a set value other than Y1 and Y2).

Figure 8:
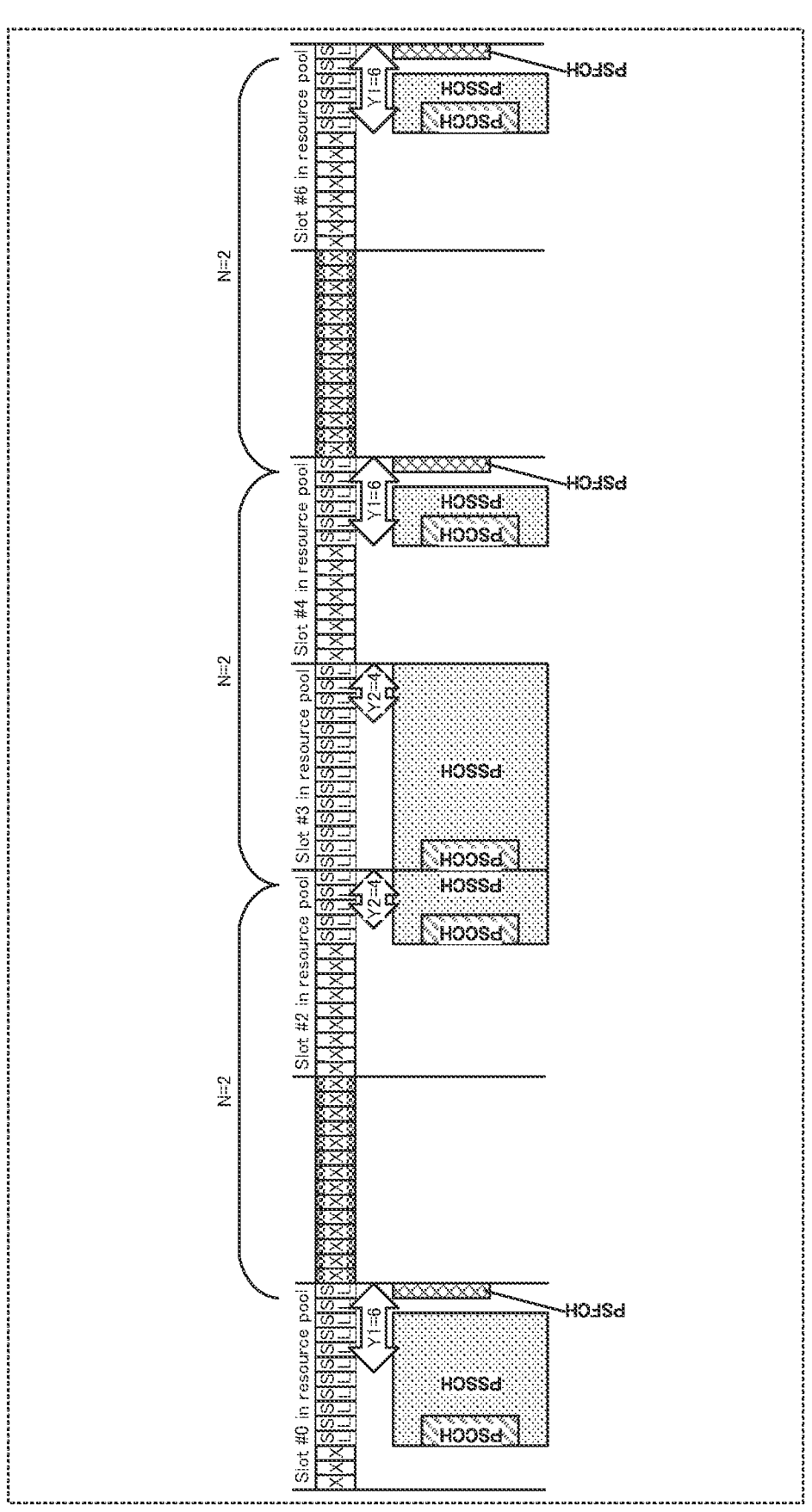
FIG. 8 illustrates exemplary mapping of the sidelink channels according to Operation Example 2.

FIG. 8 illustrates exemplary mapping of the sidelink channels according to Operation Example 2.

In FIG. 8, the number of PSFCH symbols is set to 1, and the PSFCH is mapped at the back (e.g., end) part of SL symbols in a slot. In addition, Y1=6, Y2=4, and N=2 in FIG. 8.

As illustrated in FIG. 8, the numbers of SL symbols in slots #0, #4, and #6 corresponding to the PSFCH transmission period are 11 symbols, 6 symbols, and 6 symbols, respectively. The numbers of SL symbols in slots #0, #4, and #6 are 6 or more symbols, and the condition of Y1 (=6) or more is satisfied, so that the PSCCH. PSSCH, and PSFCH are mapped.

Meanwhile, the number of SL symbols per slot in slot #2 corresponding to the PSFCH transmission period is 5 symbols as illustrated in FIG. 8. In slot #2, the number of SL symbols does not satisfy the condition of Y1 (=6) or more but satisfies the condition of Y2 (=4) or more, so that the PSCCH and PSSCH may be mapped while no PSFCH is mapped.

In addition, as illustrated in FIG. 8, the number of SL symbols per slot in slot #3 not corresponding to the PSFCH transmission period is 14 symbols. The number of SL symbols satisfies the condition of Y2 (=4) or more in slot #3, so that the PSCCH and PSSCH are mapped.

In Operation Example 2, for example, a PSFCH configuration (e.g., transmission period N of the PSFCH) and an SL symbol configuration (e.g., the number of SL symbols) per slot are configured to terminal 200. Further, in Operation Example 2, for example, the number of SL symbols in a slot (e.g., slot #2 in FIG. 8) where mapping of the PSCCH, PSSCH, and PSFCH is configured is possibly less than Y1 symbols. Even when the number of SL symbols in the slot is less than Y1, terminal 200 assumes mapping of the PSCCH and PSSCH as long as the condition of Y2 or more is satisfied (e.g., Y1>the number of SE symbols≥Y2).

In other words, terminal 200 maps the PSCCH, PSSCH and PSFCH in the slot when the number of SL symbols is Y1 or more, and maps some channels (e.g., PSCCH and PSSCH) among the PSCCH, PSSCH, and PSFCH without mapping the remaining channel (e.g., PSFCH) when the number of SL symbols is less than Y1. Additionally, when the PSCCH and PSSCH are mapped, a resource reserved for the PSFCH may be allocated to the PSCCH or PSSCH, for example.

With such channel mapping in slots in Operation Example 2, even in a case where there is a slot that corresponds to PSFCH transmission period N and includes less than Y1 SL symbols, for example, terminal 200 can still transmit and receive the PSCCH and PSSCH by skipping PSFCH transmission in the slot.

Note that the following methods, for example, may be applied for processing of a feedback signal (e.g., ACK/NACK information) that is supposed to be transmitted in the PSFCH the transmission of which has been skipped.

1. Terminal 200 may, for example, cancel (i.e., drop) the transmission of the PSFCH (e.g., ACK/NACK information). For example, another terminal 200 that has transmitted the PSSCH (e.g., data signal) corresponding to the PSFCH may assign a signal that does not require a feedback signal transmitted or received when recognizing the dropping of the PSFCH in the receiver terminal of the PSSCH.

2. Terminal 200 may transmit the PSFCH, for example, in a slot for sidelink subsequent to the slot where the PSFCH transmission has been skipped. For example, in FIG. 8, terminal 200 may transmit the PSFCH in slot #3, which is subsequent to slot #2 where the PSFCH transmission has been skipped. Such PSFCH transmission reduces the delay of the feedback signal. Note that the slot for transmitting the PSFCH is not limited to the slot subsequent to the slot where the PSFCH transmission has been skipped, and may be a slot that is two or more slots after the slot where the PSFCH transmission has been skipped.

3. Terminal 200 may transmit the PSFCH, for example, at a PSFCH transmission timing subsequent to the slot where the PSFCH transmission has been skipped (e.g., N slots or L slots later). For example, in FIG. 8, terminal 200 may transmit the PSFCH in slot #4, which is the PSFCH transmission timing subsequent to slot #2.

4. For example, when a PSFCH for transmitting another ACK/NACK information portion is mapped in a slot for sidelink subsequent to the slot where the PSFCH transmission has been skipped or in a slot that is a subsequent PSFCH transmission timing, terminal 200 may perform bundling of the ACK/NACK information portions in the PSFCH and transmit the resultant ACK/NACK information. Here, the "bundling" is a method of configuring NACK when at least one of a plurality of the ACK/NACK information portions is NACK, and configuring ACK when all is ACK.

5. For example, when a PSFCH for transmitting another ACK/NACK information portion is mapped in a slot for sidelink subsequent to the slot where the PSFCH transmission has been skipped or in a slot that is a subsequent PSFCH transmission timing, terminal 200 may multiplex and transmit the ACK/NACK information portions. Note that the multiplexed transmission of ACK/NACK information portions increases the amount of information, and thus terminal 200 may transmit the ACK/NACK information portions in a plurality of sequences or resources, for example.

Operation Example 3

In Operation Example 1 (e.g., FIG. 7) and Operation Example 2 (e.g., FIG. 8), descriptions have been given of an example where the PSFCH is mapped to the last symbol in a slot in a resource pool for sidelink, but the present disclosure is not limited to the example.

Figure 9:
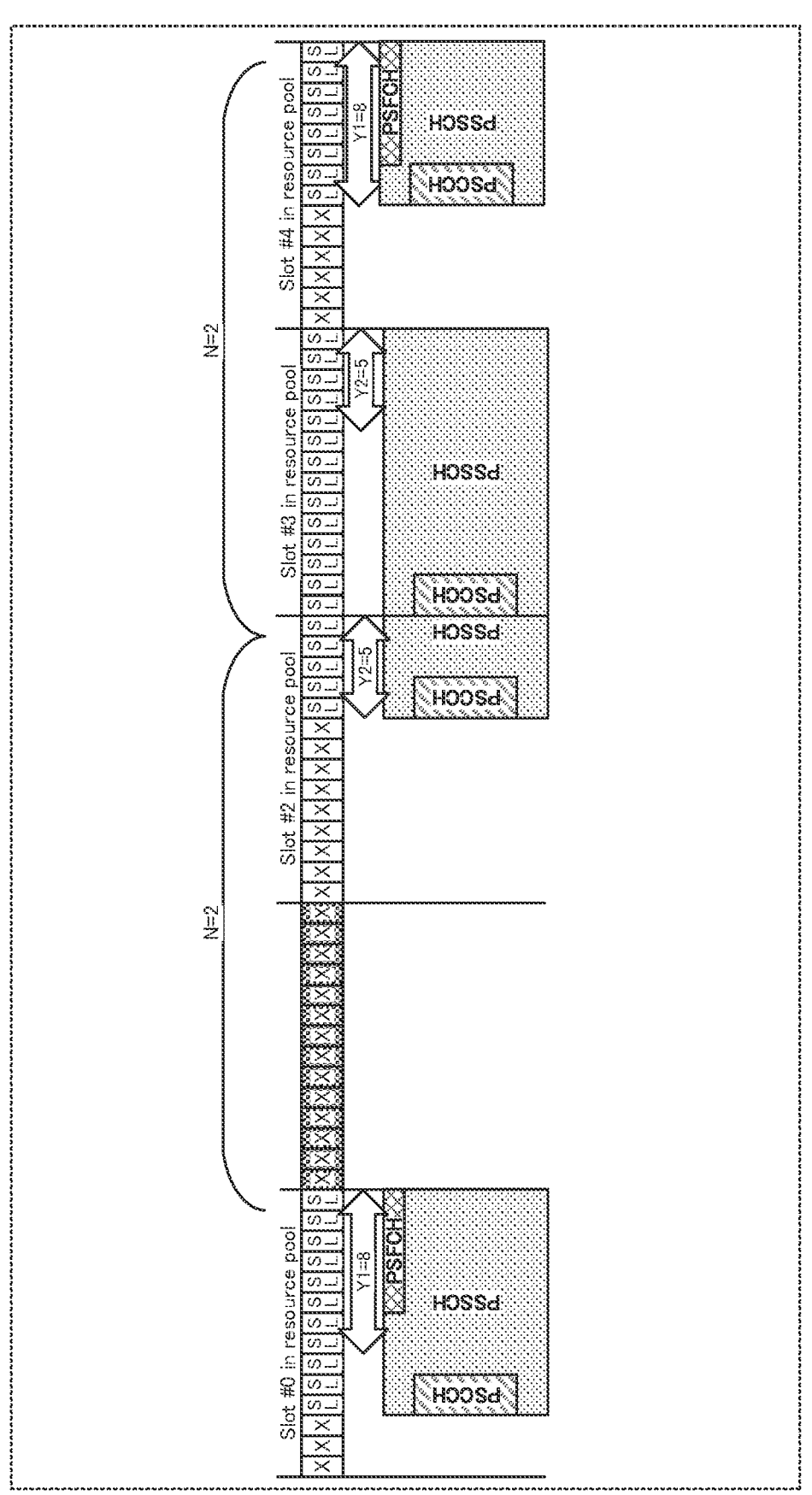
FIG. 9 illustrates exemplary mapping of the sidelink channels according to Operation Example 3.

For example, as illustrated in FIG. 9, the PSFCH may be mapped over a plurality of symbols in a slot in a resource pool for sidelink. In FIG. 9, the PSFCH is mapped over 6 symbols in a slot. In other words, FIG. 9 illustrates a channel format where the PSFCH is mapped over 6 symbols and the PSCCH is mapped over 2 symbols.

In addition, set values Y1 and Y2 may vary, for example, depending on the PSFCH format. For example, Y1 and Y2 are respectively set to 6 and 4 in the format where the PSFCH is mapped to the last symbol in a slot as in Operation Example 1 (FIG. 7) or Operation Example 2 (FIG. 8). In contrast, Y1 and Y2 may be respectively set to 8 and 5 in the format where the PSFCH is mapped over a plurality of symbols (e.g., six symbols) in a slot as illustrated in FIG. 9. For example, in FIG. 9, when the number of SL symbols in a slot is Y1 (=8) or more, the PSCCH (2 symbols) and the PSFCH (6 symbols) can be transmitted by terminal 200 without overlapping with each other in the time domain.

For example, as illustrated in FIG. 9, the numbers of SL symbols in slots #0 and #4 corresponding to the PSFCH transmission period are 11 symbols and 8 symbols respectively, which are equal to or greater than Y1, so that terminal 200 maps the PSCCH, PSSCH and PSFCH. Meanwhile, as illustrated in FIG. 9, the number of SL symbol in slot #2 corresponding to the PSFCH transmission period is 5 symbols, which is less than Y1 and equal to or greater than Y2, so that terminal 200 maps the PSCCH and PSSCH without mapping the PSFCH.

Note that, in the format illustrated in FIG. 9, both the values of Y1 and Y2 are different from the values of Y1 and Y2 in the formats illustrated in FIGS. 7 and 8, for example, but the present disclosure is not limited to this, and the value of Y2, for example, may be set to the same value regardless of the PSFCH format.

Further, by way of example, the PSFCH and PSSCH are mapped to the same symbols but the PSFCH and PSCCH are not mapped to the same symbols in FIG. 9. Such mapping reserves the transmission power for the PSCCH. Both the PSCCH and PSFCH are control signals and the transmission power is possibly distributed preferentially over the PSSCH, for example. When the PSCCH and PSFCH are mapped to the same symbols, the transmission power for the PSCCH is reduced, for example. This is why the PSCCH and PSFCH are not mapped to the same symbols. Note that the PSCCH and PSFCH may be mapped to the same symbols in a case where the reduction of the transmission power for the PSCCH is less likely to affect the transmission, for example.

Operation Examples 2 and 3 have been each described, thus far.

Embodiment 3

A base station and a terminal according to the present embodiment have the same basic configuration as those of base station 100 and terminal 200 according to Embodiment 1.

In the present embodiment, terminal 200 determines mapping of one or more channels in a slot based on the number of SL symbols available in the slot, and transmits the channels according to the determined mapping of the channels.

For example, when a slot where a plurality of channels, such as the PSCCH, PSSCH, and PSFCH, are configured has a large number of SL symbols (e.g., the number of SL symbols in the slot is Y1 or more), terminal 200 maps the PSCCH, PSSCH, and PSFCH in the slot. Meanwhile, when a slot where a plurality of channels are configured has a small number of SL symbols (e.g., the number of SL symbols in the slot is less than Y1), terminal 200 maps the PSFCH, for example.

With such channel mapping in slots, terminal 200 can transmit a PSFCH signal, for example, even in a slot with insufficient SL symbols for transmitting a plurality of channels, and the slots are effectively used accordingly. Thus, the present embodiment makes it possible to improve the transmission efficiency of sidelink communication.

Operation Example 4 according to the present embodiment will be described below.

Operation Example 4

In Operation Example 4, Y1 and Y3 are configured to terminal 200.

In addition, a transmission timing of the PSFCH is configured to be period N, for example. In other words, the PSFCH is mapped every N slots.

Operation Example 4 includes a condition where the number of SL symbols is Y1 or more symbols in a slot where the PSCCH, PSSCH, and PSFCH are mapped, as in Operation Example 1. Operation Example 4 also includes a condition where the number of SL symbols is Y3 or more symbols in a slot where the PSFCH is mapped while neither the PSCCH nor PSSCH is mapped.

Unlike Operation Example 1, however, a condition where the number of SL symbols is Y1 or more symbols in a slot corresponding to PSFCH transmission period N or a condition where the number of SL symbols is Y3 or more symbols in the slot corresponding to PSFCH transmission period N need not be satisfied in Operation Example 4. In other words, less than Y1 SL symbols or less than Y3 SL symbols may be configured in a slot corresponding to PSFCH transmission period N in Operation Example 4.

When the condition where the number of SL symbols is Y1 or more symbols is not satisfied in a slot where the PSFCH is to be mapped but, for example, the condition where the number of SL symbols is Y3 or more symbols is satisfied, terminal 200 may map the PSFCH without mapping the PSCCH and PSSCH.

Figure 10:
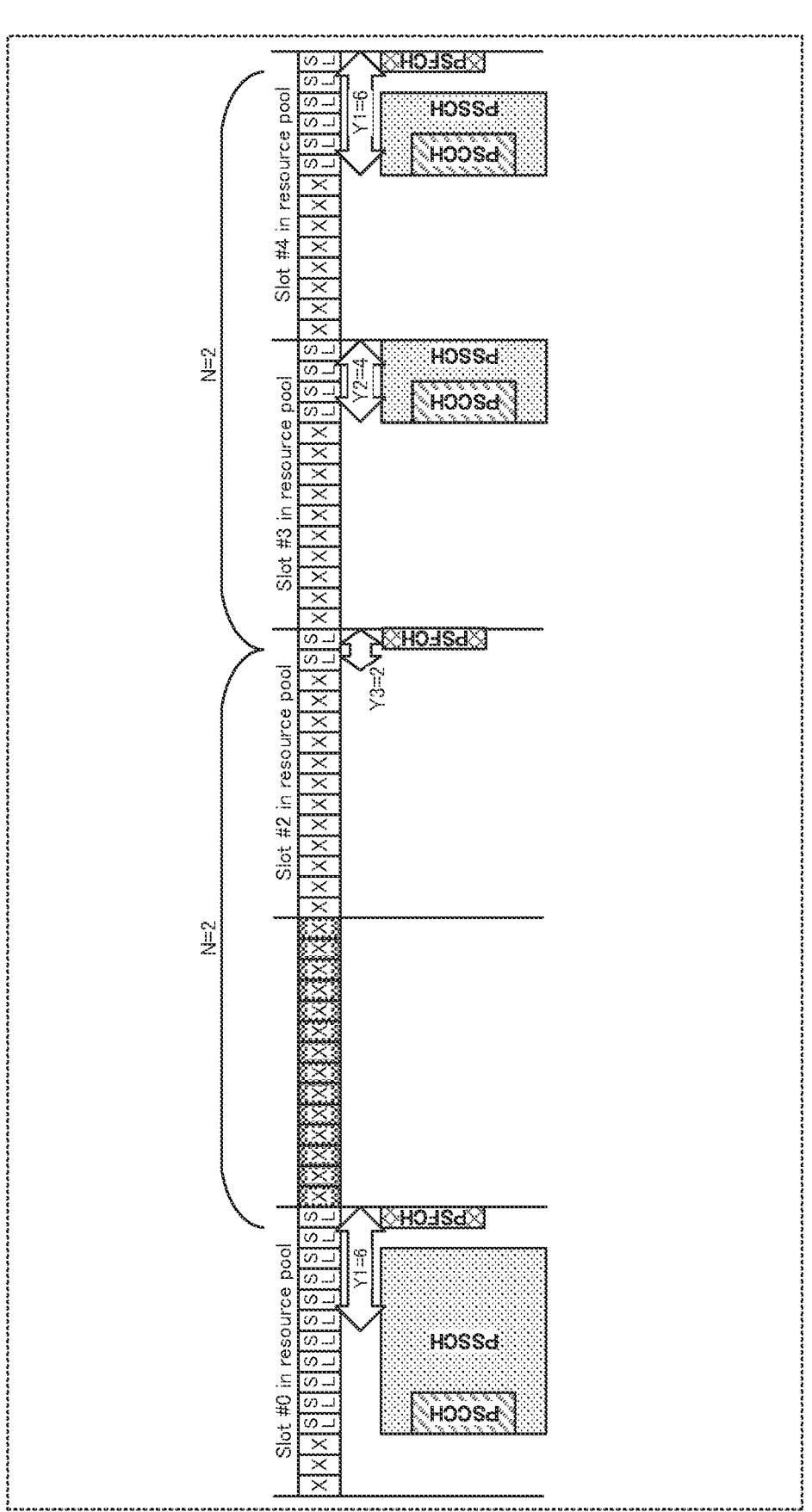
FIG. 10 illustrates exemplary mapping of the sidelink channels according to Operation Example 4.

FIG. 10 illustrates exemplary mapping of the sidelink channels according to Operation Example 4.

In FIG. 10, the number of PSFCH symbols is set to 1, and the PSFCH is mapped at the back (e.g., end) part of SL symbols in a slot. In addition. Y1=6, Y3=2, and N=2 in FIG. 10. In Operation Example 4, Y3 is set to 2 symbols assuming 1 symbol for transmitting the PSFCH and 1 symbol corresponding to processing time for automatic gain control (AGC) prior to the PSFCH transmission, by way of example.

As illustrated in FIG. 10, the numbers of SL symbols in slots #0 and #4 corresponding to the PSFCH transmission period are 11 symbols and 6 symbols, respectively. The numbers of SL symbols in slots #0 and #4 are 6 or more symbols, and the condition of Y1 (=6) or more is satisfied, so that the PSCCH, PSSCH, and PSFCH are mapped.

Meanwhile, the number of SL symbols per slot in slot #2 corresponding to the PSFCH transmission period is 2 symbols as illustrated in FIG. 10. In slot #2, the number of SL symbols does not satisfy the condition of Y1 (=6) or more but satisfies the condition of Y3 (=2) or more, so that the PSFCH is mapped while neither the PSCCH nor PSSCH is mapped.

In addition, as illustrated in FIG. 10, the number of SL symbols per slot in slot #3 not corresponding to the PSFCH transmission period is 4 symbols. The number of SL symbols satisfies the condition of Y2 (=4) or more in slot #3, so that the PSCCH and PSSCH are mapped.

In Operation Example 4, for example, a PSFCH configuration (e.g., transmission period N of the PSFCH) and an SL symbol configuration (e.g., the number of SL symbols) per slot are configured to terminal 200. Further, in Operation Example 4, for example, the number of SL symbols in a slot (e.g., slot #2 in FIG. 10) where mapping of the PSCCH, PSSCH, and PSFCH is configured is possibly less than Y1 symbols. Even when the number of SL symbols in the slot is less than Y1, terminal 200 assumes mapping of the PSFCH as long as the condition of Y3 or more is satisfied (e.g., Y1>the number of SL symbols≥Y3).

In other words, terminal 200 maps the PSCCH, PSSCH and PSFCH in the slot when the number of SL symbols is Y1 or more, and maps some (e.g., PSFCH) of the PSCCH, PSSCH, and PSFCH without mapping the remaining channels (e.g., PSCCH and PSSCH) when the number of SL symbols is less than Y1.

With such channel mapping in slots in Operation Example 4, even in a case where there is a slot that corresponds to PSFCH transmission period N and includes less than Y1 SL symbols, for example, terminal 200 can still transmit and receive the PSFCH by not mapping the PSCCH and PSSCH in the slot. Thus, Operation Example 4 makes it possible to reduce the delay of the feedback signal. In other words, in Operation Example 4, terminal 200 can transmit the PSFCH (e.g., 1 symbol) even in a slot with a small number of SL symbols (e.g., a slot that includes less than Y1 SL symbols and cannot transmit the PSCCH and PSSCH), and the slots are effectively used accordingly.

Note that the slot where the PSFCH is mapped while neither the PSCCH nor PSSCH is mapped is determined from the values of Y1, Y3, and N in the present embodiment. The present disclosure is not limited to this, however, and for example, the slot where the PSFCH is mapped while neither the PSCCH nor PSSCH is mapped may be configured in advance. In such a slot, for example, mapping of the PSCCH and PSSCH is not configured and mapping of the PSFCH is configured. In the slot where the PSFCH is mapped, terminal 200 need not monitor the PSCCH and PSSCH, for example, and may eliminate the operation of detecting whether signal transmission by another terminal is in progress, which is called "sensing", for example, thereby reducing power consumption.

Embodiment 4

A base station and a terminal according to the present embodiment have the same basic configuration as those of base station 100 and terminal 200 according to Embodiment 1.

In the present embodiment, terminal 200 determines mapping of one or more channels in a slot based on the number of SL symbols available in the slot, and transmits the channels according to the determined mapping of the channels.

For example, when a slot where a plurality of channels, such as the PSCCH, PSSCH, and PSFCH, are configured has a large number of SL symbols (e.g., the number of SL symbols in the slot is Y1 or more), terminal 200 maps the PSCCH, PSSCH, and PSFCH in the slot.

Meanwhile, when a slot where a plurality of channels are configured has a small number of SL symbols (e.g., the number of SL symbols in the slot is less than Y1), terminal 200 may map some of the plurality of channels in the slot, and need not map the remaining channel(s). Such a channel to be mapped may be, for example, either one of the PSSCH (e.g., channel for transmitting a data signal) or the PSCCH (e.g., channel for transmitting assignment information of the data signal). Alternatively, such channels to be mapped may be, for example, either one of the PSSCH or PSCCH, and the PSFCH.

With such channel mapping in slots, terminal 200 can transmit a PSCCH or PSSCH signal, for example, even in a slot with insufficient SL symbols for transmitting a plurality of channels, and the slots are effectively used accordingly. Thus, the present embodiment makes it possible to improve the transmission efficiency of sidelink communication.

Operation examples (e.g., Operation Examples 5 and 6) according to the present embodiment will be described below.

Operation Example 5

In Operation Example 5, Y1, Y5, and Y6 are configured to terminal 200.
<Y5 Symbol(s)>
When the number of SL symbols per slot is equal to or greater than Y5 symbols, terminal 200 can map the PSSCH in the slot. Further, for the combination of Y1 and Y5, when Y1>Y5 and Y1>SL symbols≥Y5, terminal 200 cannot map the PSCCH but can map the PSSCH in the slot.
<Y6 Symbol(s)>
When the number of SL symbols per slot is equal to or greater than Y6 symbols in a slot where the PSFCH is mapped, terminal 200 can map the PSSCH and PSFCH in the slot. Further, for the combination of Y1 and Y6, when Y1>Y6 and Y1>SL symbols≥Y6, terminal 200 cannot map the PSCCH but can map the PSSCH and PSFCH in the slot.

For example, Operation Example 5 includes a condition where the number of SL symbols is Y1 or more symbols in a slot where the PSCCH, PSSCH, and PSFCH are mapped, as in Operation Example 1. Operation Example 5 also includes a condition where the number of SL symbols is Y5 or more symbols in a slot where the PSSCH is mapped while no PSCCH is mapped. There also is a provided condition where the number of SL symbols is Y6 or more symbols in a slot where the PSSCH and PSFCH are mapped while no PSCCH is mapped.

Figure 11:
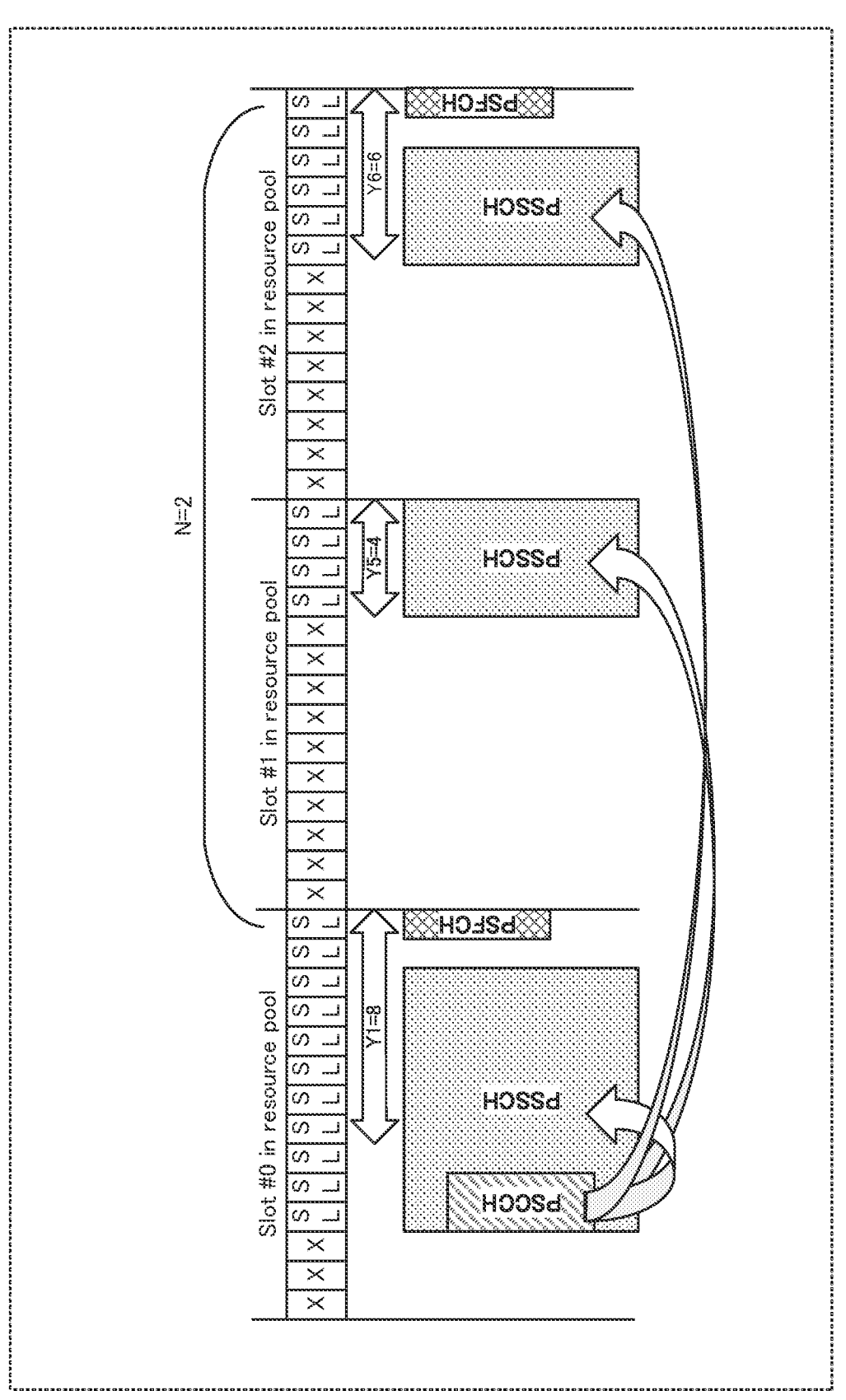
FIG. 11 illustrates exemplary mapping of the sidelink channels according to Operation Example 5.

FIG. 11 illustrates exemplary mapping of the sidelink channels according to Operation Example 5.

In FIG. 11, the number of PSFCH symbols is set to 1, and the PSFCH is mapped at the back (e.g., end) part of SL symbols in a slot. In addition, Y1=8, Y5=4, Y6=6, and PSFCH transmission period N=2 in FIG. 11.

As illustrated in FIG. 11, the number of SL symbols per slot in slot #0 corresponding to the PSFCH transmission period is 11 symbols. The number of SL symbols in slot #0 satisfies the condition of Y1 (=8) or more, so that the PSCCH, PSSCH, and PSFCH are mapped.

In addition, the number of SL symbols per slot in slot #1 not corresponding to the PSFCH transmission period is 4 symbols as illustrated in FIG. 11. In slot #1, the number of SL symbols does not satisfy the condition of Y1 (=8) or more, but satisfies the condition of Y5 (=4) or more, so that the PSSCH is mapped.

Further, the number of SL symbols per slot in slot #2 corresponding to the PSFCH transmission period is 6 symbols as illustrated in FIG. 11. In slot #2, the number of SL symbols does not satisfy the condition of Y1 (=8) or more, but satisfies the condition of Y6 (=6) or more, so that the PSSCH and PSFCH are mapped.

In a case where the PSSCH is mapped without the PSCCH as in slots #1 and #2 illustrated in FIG. 11, terminal 200 transmits SCI (i.e., PSCCH), which indicates reception of the PSSCH, in a preceding slot. For example, in FIG. 11, the SCI transmitted in the PSCCH in slot #0 indicates the reception of the PSSCHs in slots #0, #1, and #2. Terminal 200, for example, may indicate the number of consecutive slots or slot numbers to assign by the SCI. For example, in FIG. 11, a method in which terminal 200 transmits transport blocks with the same HARQ process ID in slots #0, #1, and #2 is also referred to as "repetition" or "blind repetition".

Note that, although both Y5 and Y6 are configured to terminal 200 in FIG. 11, either Y5 or Y6 may be configured.

Operation Example 6

In Operation Example 6, Y1, Y7, and Y8 are configured to terminal 200.

<Y7 Symbol(s)>
When the number of SL symbols per slot is equal to or greater than Y7 symbols, terminal 200 can map the PSCCH in the slot. Further, for the combination of Y1 and Y7, when Y1>Y7 and Y1>SL symbols≥Y7, terminal 200 cannot map the PSSCH but can map the PSCCH in the slot.
<Y8 Symbol(s)>
When the number of SL symbols per slot is equal to or greater than Y8 symbols in a slot where the PSFCH is mapped, terminal 200 can map the PSCCH and PSFCH in the slot. Further, for the combination of Y1 and Y8, when Y1>Y8 and Y1>SL symbols≥Y8, terminal 200 cannot map the PSSCH but can map the PSCCH and PSFCH in the slot.

For example, Operation Example 6 includes a condition where the number of SL symbols is Y1 or more symbols in a slot where the PSCCH, PSSCH, and PSFCH are mapped, as in Operation Example 1. Further, Operation Example 6 also includes a condition where the number of SL symbols is Y2 or more symbols in a slot where the PSCCH and PSSCH are mapped while no PSFCH is mapped. In addition, there is a provided condition where the number of SL symbols is Y7 or more symbols in a slot where the PSCCH is mapped while no PSSCH is mapped. There also is a provided condition where the number of SL symbols is Y8 or more symbols in a slot where the PSCCH and PSFCH are mapped while no PSSCH is mapped.

FIG. 12 illustrate exemplary mapping of the sidelink channels according to Operation Example 6.

In FIG. 12, the number of PSFCH symbols is set to 1, and the PSFCH is mapped at the back (e.g., end) part of SL symbols in a slot. In addition, Y1=8, Y2=6, Y7=3, Y8=5. and PSFCH transmission period N=2 in FIG. 12.

Figures 12A, 12B:
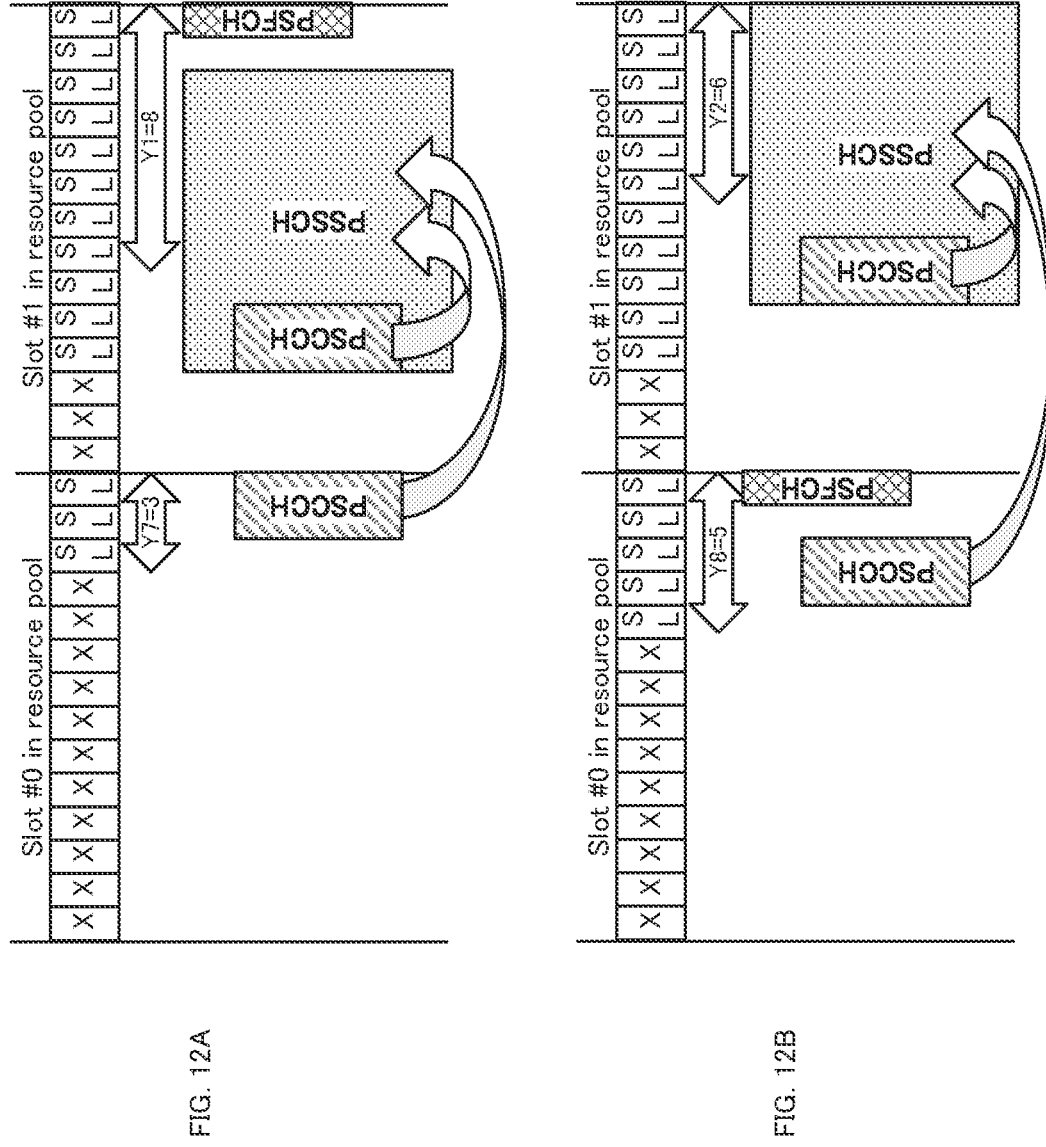
FIG. 12A illustrates exemplary mapping of the sidelink channels according to Operation Example 6.
FIG. 12B illustrates other exemplary mapping of the sidelink channels according to Operation Example 6.

Slot #0 illustrated in FIG. 12A, for example, does not correspond to the PSFCH transmission period, and the number of SL symbols in slot #0 is 3 symbols. In slot #0, the number of SL symbols does not satisfy the condition of Y2 (=6) or more symbols but satisfies the condition of Y7 (=3) or more symbols, so that the PSCCH is mapped. The PSCCH mapped in slot #0 may include, for example, the SCI indicating reception of the PSSCH mapped in a slot after slot #0 (slot #1 in FIG. 12A), and may also include a control signal (e.g., group common SCI) received by a plurality of terminals 200.

Slot #1 illustrated in FIG. 12A, for example, corresponds to the PSFCH transmission period, and the number of SL symbols in slot #1 is 11 symbols. The number of SL symbols in slot #1 satisfies the condition of Y1 or more, so that the PSCCH, PSSCH, and PSFCH are mapped.

Slot #0 illustrated in FIG. 12B, for example, corresponds to the PSFCH transmission period, and the number of SL symbols in slot #0 is 5 symbols. In slot #0, the number of SL symbols does not satisfy the condition of Y1 (=8) or more symbols but satisfies the condition of Y8 (=5) or more symbols, so that the PSCCH and PSFCH are mapped. As in FIG. 12A, the PSCCH mapped in slot #0 may include the SCI indicating reception of the PSSCH mapped in a slot after slot #0 (slot #1 in FIG. 12B), and may also include a control signal (e.g., group common SCI) received by a plurality of terminals 200.

Slot #1 illustrated in FIG. 12B, for example, does not correspond to the PSFCH transmission period, and the number of SL symbols in slot #1 is 11 symbols. The number of SL symbols satisfies the condition of Y2 (=6) or more in slot #1, so that the PSCCH and PSSCH are mapped.

As illustrated in FIGS. 12A and 12B, terminal 200 may indicate the reception of the PSSCH in slot #1 by the SCI transmitted in the PSCCH in slot #0 and the SCI transmitted in the PSCCH in slot #1. For example, the transmission of information including duplicate content by the SCI in slot #0 and the SCI in slot #1 improves the received quality of the SCI in destination terminal 200. Further, the transmission of the SCIs in a plurality of slots as in FIGS. 12A and 12B increases the probability for another terminal to detect (i.e., sense) the SCIs and avoid a transmission collision, for example.

Note that, although both Y7 and Y8 are configured to terminal 200 in FIG. 12, either Y7 or Y8 may be configured.

Embodiments of the present disclosure have been each described, thus far.

Other Embodiments

1. Terminals that transmit and receive on sidelink may include, for example, a terminal that performs transmission processing and no reception processing, a terminal that performs reception processing and no transmission processing, or a terminal that performs both transmission and reception.

2. A slot where channels, such as a PSCCH, PSSCH, PSFCH, and PSBCH, are mapped is, for example, a slot where these channels can be transmitted and received. The slot where channels, such as the PSCCH, PSSCH, PSFCH, and PSBCH, are mapped, however, may include a slot with no signal to be transmitted or received according to determination of terminal 200 or resource allocation, for example.

3. As an example of mapping of a PSCCH and PSSCH, a description has been given of a case where the PSCCH is mapped to the first few symbols of the PSSCH as illustrated in FIG. 1, for example, but the mapping of a PSCCH and PSSCH is not limited to the mapping illustrated in FIG. 1. The embodiments described above can be applied to, for example, a case where a PSCCH and PSSCH are mapped with Time Division Multiplexing (TDM) or FDM.

4. The number of allocation symbols for a PSSCH may be assigned, for example, by a corresponding PSCCH, or may be pre-configured when a resource pool is configured.

For example, in a case where the number of symbols for a PSSCH is not assigned by a PSCCH but assigned semi-statically, the condition "the number of SL symbols is equal to or greater than Y2", which is applied to the mapping of the PSCCH and PSSCH in the above embodiments, may be replaced by the condition "the number of SL symbols is equal to or greater than the number of symbols for the PSSCH".

In addition, the condition "the number of SL symbols is equal to or greater than Y1", which is applied to the mapping of the PSCCH, PSSCH, and PSFCH in the above embodiments, may be replaced by the condition "the number of SL symbols is equal to or greater than a value obtained by adding the number of transmission symbols for a PSFCH (e.g., 2 or 3 symbols) to the number of symbols for the PSSCH".

Note that the number of symbols for the PSSCH, the number of symbols for the PSCCH, or the number of symbols for the PSFCH may be a value including symbols for AGC configured before or after the channel.

5. In a case where a configuration on sidelink is configured to terminal 200 in advance, the configuration on sidelink may be configured in a specification (e.g., standard), may be configured in an application layer called Pre-configured, may be configured in an SIM mounted on terminal 200, may be configured in a higher layer such as an SIB called configured or other RRC, and may be configured by medium access control (MAC), for example.

6. At least one of the values Y1 to Y8 may be variably set, for example, depending on the size of the frequency domain of a resource pool or a sidelink BWP. For example. the larger the size of the frequency domain is, the smaller the values Y1 to Y8 may be set. The larger the size of the frequency domain is, the larger the resource amount per symbol is, and thus a TBS can be set to a larger size even when a value for at least one of Y1 to Y8 is set to a smaller value. Further, when the size of the frequency domain is large (e.g., equal to or greater than a threshold), at least one of the values Y1 to Y8 need not be set. In other words, when the size of the frequency domain is large (e.g., equal to or greater than a threshold), at least one of the values Y1 to Y8 may be set to 0.

7. At least one of the values Y1 to Y8 may be set to a value that includes the number of symbols for AGC mapped to a symbol before or after the channel, for example, or may be set to a value that does not include the number of symbols for AGC. Further, in a case where at least one of the values Y1 to Y8 is set to a value that does not include the number of symbols for AGC, for example, terminal 200 may determine whether a channel can be mapped in a slot (in other words, whether a channel signal can be transmitted) based on a value obtained by adding the number of symbols for the AGC to the values Y1 to Y8.

8. The expression "equal to or greater than Y symbols (Y is, for example, any of Y1 to Y8)" or "Y or more symbols" may be replaced by "greater than Y symbols". In other words, the expression "less than Y symbols" may be replaced by "less than or equal to Y symbols".

9. Although consecutive slots have been described in Operation Examples 1 to 6, the slots need not be consecutive in time.

10. The format of a PSFCH is not limited to, for example, the formats illustrated in FIG. 1, and may be another format.

11. The number of symbols for a PSCCH is not limited to 2 symbols, and may be 1 symbol or 3 to 14 symbols. Additionally, the number of symbols for a PSFCH is not limited to 1 symbol, 2 symbols, or 6 symbols, and may be another number of symbols. Also, the number of symbols for a PSSCH is not limited to the numbers in the above examples, and may be another number of symbols.

12. An exemplary embodiment of the present disclosure is not limited to being applied to sidelink communication (i.e., direct communication between a plurality of terminals), and may be applied to Uu link communication (i.e., communication between base station 100 and terminal 200). For example, in a case where there is a restriction on the number of symbols in Uu link communication, an exemplary embodiment of the present disclosure may be applied. In this case, for example, the sidelink channel mapping described in each of the above embodiments may be replaced by Uu link channel mapping. For example, the PSCCH may be replaced by a Physical Downlink Control Channel (PDCCH), the PSSCH may be replaced by a Physical Downlink Shared Channel (PDSCH) or Physical Uplink Shared Channel (PUSCH), the PSFCH may be replaced by a Physical Uplink Control Channel (PUCCH), and the PSBCH may be replaced by a Physical Broadcast Channel (PBCH).

13. In Mode 1, terminal 200 may dynamically receive a configuration of the number of SL symbols per slot from base station 100 over a Uu link with a control signal such as a PDCCH. Terminal 200 can dynamically and variably configure the number of SL symbols.

14. In the above-described embodiments, descriptions have been given of a case where the number of symbols available for channel mapping is configured for any one or a combination of the PSCCH, PSSCH, PSFCH, and PSBCH, as an example. An exemplary embodiment of the present disclosure, however, may be applied to another signal or channel.

For example, an exemplary embodiment of the present disclosure is applicable to signals such as: a demodulation reference signal (DMRS) and sounding reference signal (SRS) as reference signals; a signal for a scheduling request (scheduling request indication (SRI)); a physical random access channel (PRACH); a primary synchronization signal (PSS) for synchronization; or a secondary synchronization signal (SSS).

In a case of DMRS, for example, the set values (corresponding to, for example, Y1 to Y8) for the number of symbols for determining channel mapping in a slot for sidelink may be configured according to a configuration of the number of DMRS symbols or the presence or absence of an additional DMRS.

15. In the above-described embodiments, a case has been described in which DL symbols (represented as "D", for example) on a Uu link between base station 100 and a terminal is not used for sidelink communication, but the DL symbols on a Uu link may be used for sidelink communication. The DL symbols between base station 100 and terminal 200 may also be used for the sidelink communication when, for example, the effect of interference by the sidelink on the DL on the Uu link between base station 100 and terminal 200 is negligible (e.g., the effect of interference is not significant). In this case, the above embodiments may be applied based on the number of SL symbols including the DL symbols on the Uu link, for example.

16. Operation Examples in the above embodiments may be used in combination. For example, a set value for the number of symbols to be configured to terminal 200 (e.g., at least one or a combination of Y1 to Y8 described above) may be determined according to a configuration of channel mapping in a single slot (in other words, a channel or a combination of channels mapped in a slot).

17. The time resource unit is not limited to a combination of slots and symbols, and may be, for example, a time resource unit such as a frame, suffrage, slot, subplot, or symbol, or may be another time resource unit. Further, the number of symbols included in a single slot is not limited to 14 symbols, and may be another number of symbols, for example.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, an FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas. Some non-limiting examples of such a communication apparatus include a phone (e.g, cellular (cell) phone, smart phone), a tablet, a personal computer (PC) (e.g, laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g, an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

A terminal according to an embodiment of the present disclosure includes: circuitry, which, in operation, determines mapping of one or a plurality of channels in a certain time period based on information on a number of symbols available in the time period; and a transmitter, which in operation, transmits the one or plurality of channels in accordance with the mapping.

In an embodiment of the present disclosure, a number of the one or plurally of channels mapped in the time period with the number of symbols equal to or greater than a threshold is more than a number of the one or plurality of channels mapped in the time period with the number of symbols less than the threshold.

In an embodiment of the present disclosure, the threshold is set in accordance with at least one of a type of the one or plurality of channels mapped in the time period and/or a combination of the one or plurality of channels mapped in the time period.

In an embodiment of the present disclosure, the number of symbols equal to or greater than a threshold is set in the time period where at least one of the plurality of channels transmitting a response signal for a data signal is mapped.

In an embodiment of the present disclosure, the time period where a plurality of channels are configured, when the number of symbols is equal to or greater than a first threshold, the plurality of channels are mapped in the time period, and when the number of symbols is less than the first threshold and equal to or greater than a second threshold, some of the plurality of channels are mapped in the time period and a remaining channel is not mapped in the time period.

In an embodiment of the present disclosure, the circuitry assigns a signal of the some of the plurality of channels to a resource configured for the remaining channel.

In an embodiment of the present disclosure, the some of the plurality of channels is at least one of a channel transmitting a data signal, a channel transmitting assignment information of the data signal, a channel transmitting a response signal for the data channel, and/or a broadcast channel.

In an embodiment of the present disclosure, the some of the plurality of channels are either one of a channel transmitting a data signal or a channel transmitting assignment information of the data signal, and a channel transmitting a response signal for the data channel.

In an embodiment of the present disclosure, the time period is where at least one of the plurality of channels that is used for sidelink transmission is mapped.

A communication method according to an embodiment of the present disclosure includes: determining, by a terminal, mapping of one or a plurality of channels in a certain time period based on information on a number of symbols available in the time period; and transmitting, by the terminal, the one or plurality of channels in accordance with the mapping.

The disclosure of Japanese Patent Application No. 2019-137127, filed on Jul. 25, 2019, including the specification, drawings and abstract, is incorporated herein by reference in its entirety.

INDUSTRIAL APPLICABILITY

An exemplary embodiment of the present disclosure is useful for mobile communication systems.

REFERENCE SIGNS LIST

100 Base station
101, 210 PSFCH configurator
102, 211 Resource pool configurator
103 Error correction encoder
104 Modulator
105 Signal assigner
106 Transmission section
107, 201 Receiver
108. 202 Signal separator
109 Demodulator
110 Error correction decoder
200 Terminal
203 SCI receiver
204 Uu demodulator
205 Uu error correction decoder
206 SL demodulator
207 SL error correction decoder
208 PSFCH receiver
209 ACK/NACK generator
212 SCI generator
213 Uu error correction encoder
214 Uu modulator
215 SL error correction encoder
216 SL modulator
217 Signal assigner
218 Transmission section

The invention claimed is:

1. A terminal, comprising:
circuitry, which, in operation, maps a physical sidelink shared channel (PSSCH) and a physical sidelink feedback channel (PSFCH) in a slot in a first case where there is a first number of symbols available for sidelink transmission starting at a first symbol of the slot, and maps one of the PSSCH or the PSFCH in the slot in a second case where there is a second number of symbols available for sidelink transmission starting at a second symbol of the slot, the second symbol being later than the first symbol; and
a transmitter, which, in operation, transmits the PSSCH and the PSFCH in the slot in the first case and transmits the PSSCH or the PSFCH in the slot in the second case.

2. The terminal according to claim 1, wherein information on the first number of symbols and the second number of symbols is indicated by a higher layer signaling.

3. The terminal according to claim 1, wherein the first number of symbols is larger than the second number of symbols.

4. The terminal according to claim 1, wherein the PSSCH is mapped without the PSFCH in the second case where there is the second number of symbols available in the slot.

5. The terminal according to claim 1, wherein the PSFCH is mapped without the PSSCH in the second case where there is the second number of symbols available in the slot.

6. The terminal according to claim 1, wherein a transmission cycle of the PSFCH is N slots, and the PSFCH is transmitted without the PSSCH in the second case where there is the second number of symbols available in the slot and where there is the PSFCH in the slot.

7. A communication method, comprising:
mapping a physical sidelink shared channel (PSSCH) and a physical sidelink feedback channel (PSFCH) in a first case where there is a first number of symbols available for sidelink transmission starting at a first symbol of a slot, and mapping one of the PSSCH or the PSFCH in a second case where there is a second number of symbols available for sidelink transmission starting at a second symbol of the slot, the second symbol being later than the first symbol; and
transmitting the PSSCH or the PSFCH.

8. The communication method according to claim 7, wherein information on the first number of symbols and the second number of symbols is indicated by a higher layer signaling.

9. The communication method according to claim 7, wherein the first number of symbols is larger than the second number of symbols.

10. The communication method according to claim 7, wherein the PSSCH is mapped without the PSFCH in the second case where there is the second number of symbols available in the slot.

11. The communication method according to claim 7, wherein the PSFCH is mapped without the PSSCH in the second case where there is the second number of symbols available in the slot.

12. The communication method according to claim 7, wherein a transmission cycle of the PSFCH is N slots, and the PSFCH is transmitted without the PSSCH in the second case where there is the second number of symbols available in the slot and where there is the PSFCH in the slot.

*     *     *     *     *